United States Patent
Hildreth

(10) Patent No.: US 10,268,339 B2
(45) Date of Patent: Apr. 23, 2019

(54) ENHANCED CAMERA-BASED INPUT

(71) Applicant: QUALCOMM Incorporated, San Diego, CA (US)

(72) Inventor: Evan Hildreth, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 14/150,562

(22) Filed: Jan. 8, 2014

(65) Prior Publication Data

US 2014/0118249 A1    May 1, 2014

Related U.S. Application Data

(63) Continuation of application No. 12/124,375, filed on May 21, 2008, now Pat. No. 8,659,548.

(60) Provisional application No. 60/952,448, filed on Jul. 27, 2007.

(51) Int. Cl.
| | | |
|---|---|---|
| G06F 3/0482 | (2013.01) | |
| G06F 3/01 | (2006.01) | |
| G06F 3/0484 | (2013.01) | |
| G06F 3/03 | (2006.01) | |

(52) U.S. Cl.
CPC ............ G06F 3/0482 (2013.01); G06F 3/011 (2013.01); G06F 3/017 (2013.01); G06F 3/03 (2013.01); G06F 3/0304 (2013.01); G06F 3/04842 (2013.01)

(58) Field of Classification Search
CPC ........ G06F 3/011; G06F 3/0482; G06F 3/017; G06F 3/04842; G06F 3/03; G06F 3/0304
USPC .................................................. 345/156–184
See application file for complete search history.

(56) References Cited

U.S. PATENT DOCUMENTS

| | | | |
|---|---|---|---|
| 5,565,888 A | 10/1996 | Selker | |
| 5,594,469 A * | 1/1997 | Freeman | G05B 19/106 345/157 |
| 5,745,165 A | 4/1998 | Atsuta et al. | |
| 6,130,677 A | 10/2000 | Kunz | |
| 6,160,899 A * | 12/2000 | Lee | G06F 3/017 348/77 |
| 6,272,231 B1 | 8/2001 | Maurer et al. | |
| 6,301,370 B1 * | 10/2001 | Steffens et al. | 382/103 |
| 6,545,663 B1 | 4/2003 | Arbter et al. | |

(Continued)

FOREIGN PATENT DOCUMENTS

| | | |
|---|---|---|
| EP | 1710663 A1 | 10/2006 |
| JP | H1139132 A | 2/1999 |

(Continued)

OTHER PUBLICATIONS

Fussell et al. "Gestures Over Video Streams to Support Remote Collaboration on Physical Tasks", Human-Computer Interaction, vol. 19, pp. 273-309, 2004.

(Continued)

Primary Examiner — Chineyere D Wills-Burns
(74) Attorney, Agent, or Firm — Kilpatrick Townsend & Stockton, LLP

(57) ABSTRACT

Enhanced camera-based input, in which a detection region surrounding a user is defined in an image of the user within a scene, and a position of an object (such as a hand) within the detection region is detected. Additionally, a control (such as a key of a virtual keyboard) in a user interface is interacted with based on the detected position of the object.

31 Claims, 31 Drawing Sheets

(56) References Cited

U.S. PATENT DOCUMENTS

| | | | |
|---|---|---|---|
| 6,690,354 B2 | 2/2004 | Sze | |
| 6,771,277 B2 * | 8/2004 | Ohba | G06F 3/011 345/156 |
| 6,775,014 B2 * | 8/2004 | Foote et al. | 356/621 |
| 6,822,643 B2 | 11/2004 | Matsui et al. | |
| 6,827,579 B2 | 12/2004 | Burdea et al. | |
| 6,920,942 B2 | 7/2005 | Koederitz | |
| 6,940,454 B2 | 9/2005 | Paetzold | |
| 7,018,211 B1 | 3/2006 | Birkholzer et al. | |
| 7,124,374 B1 | 10/2006 | Haken | |
| 7,151,530 B2 | 12/2006 | Roeber et al. | |
| 7,429,988 B2 | 9/2008 | Gonsalves et al. | |
| 7,598,942 B2 | 10/2009 | Underkoffler et al. | |
| 2002/0041327 A1 * | 4/2002 | Hildreth | G06F 3/011 348/42 |
| 2002/0064149 A1 | 5/2002 | Elliott et al. | |
| 2002/0097247 A1 * | 7/2002 | Ohba | G06F 3/011 345/501 |
| 2003/0227439 A1 | 12/2003 | Lee et al. | |
| 2004/0047461 A1 | 3/2004 | Weisman et al. | |
| 2005/0059488 A1 | 3/2005 | Larsen et al. | |
| 2005/0080849 A1 | 4/2005 | Wee et al. | |
| 2005/0239028 A1 | 10/2005 | Wu et al. | |
| 2006/0010400 A1 | 1/2006 | Dehlin et al. | |
| 2006/0017654 A1 * | 1/2006 | Romo | G06F 3/016 345/7 |
| 2006/0061548 A1 | 3/2006 | Kitaura | |
| 2006/0101016 A1 | 5/2006 | Uehara | |
| 2006/0168523 A1 * | 7/2006 | Yoda | G06F 3/017 715/728 |
| 2006/0202953 A1 * | 9/2006 | Pryor et al. | 345/156 |
| 2006/0288308 A1 | 12/2006 | Enomoto et al. | |
| 2007/0008300 A1 * | 1/2007 | Yang | G06F 3/04886 345/173 |
| 2007/0009139 A1 | 1/2007 | Landschaft et al. | |
| 2007/0118820 A1 | 5/2007 | Hatakeyama | |
| 2007/0126696 A1 * | 6/2007 | Boillot | G06F 3/017 345/156 |
| 2007/0209018 A1 | 9/2007 | Lindemann | |
| 2008/0089587 A1 | 4/2008 | Kim et al. | |
| 2009/0027337 A1 | 1/2009 | Hildreth | |
| 2009/0031240 A1 | 1/2009 | Hildreth | |
| 2009/0174652 A1 * | 7/2009 | Yamamoto | A63F 13/10 345/156 |
| 2010/0235786 A1 | 9/2010 | Maizels et al. | |
| 2012/0276995 A1 | 11/2012 | Lansdale et al. | |
| 2013/0014052 A1 | 1/2013 | Frey et al. | |
| 2014/0331181 A1 | 11/2014 | Hildreth | |

FOREIGN PATENT DOCUMENTS

| | | |
|---|---|---|
| JP | 2000194469 A | 7/2000 |
| JP | 2000284879 A | 10/2000 |
| JP | 2001312743 A | 11/2001 |
| JP | 2002116859 A | 4/2002 |
| JP | 2004258714 A | 9/2004 |
| JP | 2004258766 A | 9/2004 |
| JP | 2004343653 A | 12/2004 |
| JP | 2005216061 A | 8/2005 |
| JP | 2006091948 A | 4/2006 |
| JP | 2006350853 A | 12/2006 |
| JP | 2007047900 A | 2/2007 |
| JP | 2008516322 A | 5/2008 |
| WO | WO-2005065798 A1 | 7/2005 |
| WO | WO-2006037786 A2 | 4/2006 |

OTHER PUBLICATIONS

International Search Report and Written Opinion—PCT/US2008/071224, International Search Authority—European Patent Office—Oct. 22, 2008.

Mammen et al., "Simultaneous Tracking of Both Hands by Estimation of Erroneous Observations", SPANN Lab, Department of Electrical Engg., Indian Institure of Technology, Bombay, Powai, Mumbai-400076, India, sc@ee.iitb.ac.in, 2001, pp. 83-92.

MacCormick et al., "A Probabilistic Exclusion Principle for Tracking Multiple Objects", International Journal of Computer Vision 39(1), pp. 57-71, 2000.

Lemay L., "Java Language Primer Applet", AWT, Advanced Mechanism, Japan, Prentice Hall Publishing Co., Ltd., May 10, 1997, 1st edition, pp. 300-308.

* cited by examiner

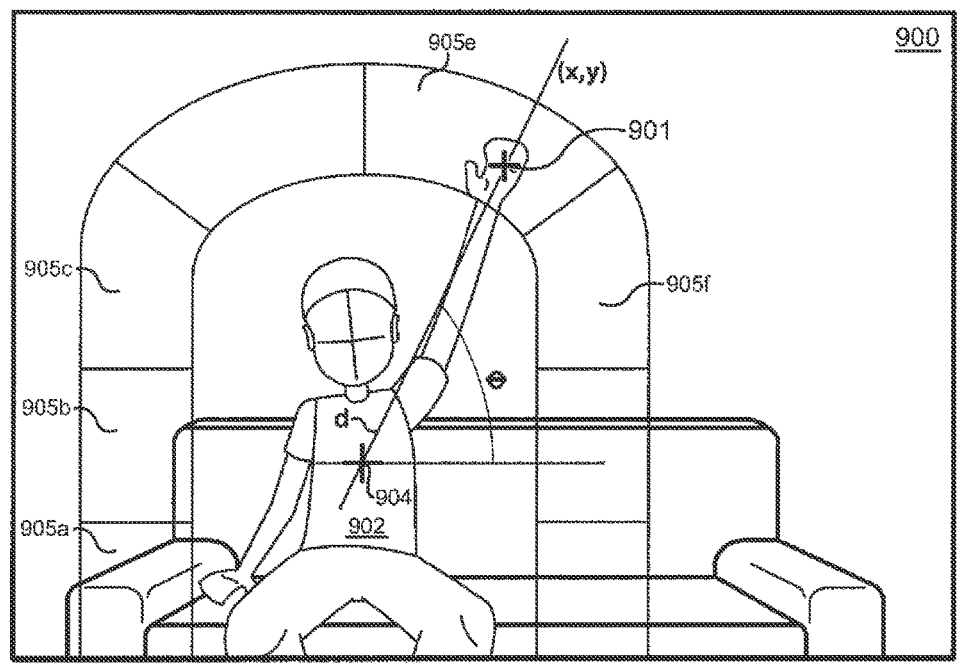
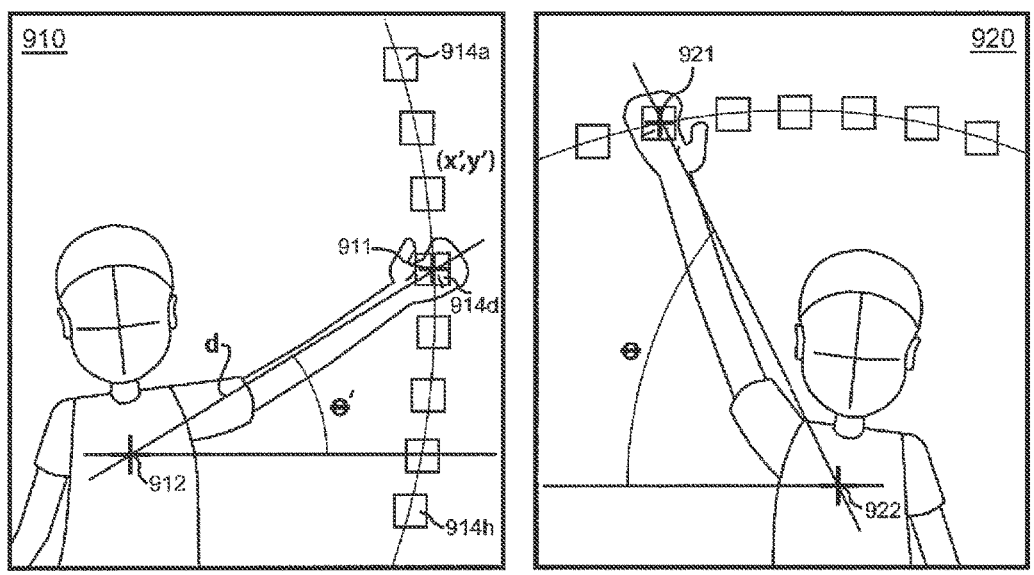
FIG.9

US 10,268,339 B2

ENHANCED CAMERA-BASED INPUT

CROSS-REFERENCES TO RELATED APPLICATIONS

This application is a continuation of prior U.S. patent application Ser. No. 12/124,375, filed May 21, 2008, which claims the benefit of U.S. Provisional Patent Application No. 60/952,448, filed Jul. 27, 2007, both of which are incorporated by reference herein for all purposes.

BACKGROUND OF THE INVENTION

Field

The present disclosure generally relates to a computer input and, according to one particular implementation, a camera-based human-computer interface.

Description of the Related Art

In the field of user interfaces, a control (or widget) is an interface element that a computer user interacts with, such as a window or a text box. In some cases, a control (such as a virtual button) may have a similar function and appearance to a physical counterpart of that control. Users typically interact with controls using a computer mouse or keyboard.

SUMMARY

In one general implementation, a user may gesticulate, for example by waving or otherwise purposefully positioning their arm or arms in the space surrounding their body. A camera takes an image of the user, and a position of the user is determined from the image. Using this position, a detection region is defined around the user where the user's hands or arms would likely be if the user intended to perform an input gesture. The hands or arms of the user are detected by examining this defined detection region, and the position or motion of these detected control objects is mapped to an input of a computer application.

In one instance, and based on an anatomical model that defines or models the abilities and restrictions of the user's body, the detection region is defined in an area of the image above the user's head and extending out to the side of the user's torso. The position or motion of the detected control objects may be mapped to a cursor, avatar, representation, a mouse event, or other element so as to interact with a control (such as a scroll bar, button, virtual keyboard, drop down menu, or any other widget) on the user interface.

According to another general implementation, a detection region surrounding a user is defined in an image of the user within a scene, and a position of an object (such as a hand) within the detection region is detected. Additionally, a control (such as a key of a virtual keyboard) in a user interface is interacted with based on the detected position of the object. Interacting with the control may further include selecting a character.

Implementations may include one or more of the following features. For example, an engagement gesture of the user may be detected, where the position of the object may be detected based on detecting the engagement gesture. The user interface may further include a representation of the user, where the control may include items aligned with a guide line defined relative to the representation, where the items are displayed without obscuring the representation. The representation of the user may further include an avatar or a cursor, where the avatar may be animated to mimic motion of the user, based on the detected position of the object. The control may be displayed in the user interface above or aside the representation.

In additional examples, defining the detection region may further include determining a position of a torso or head of the user, and defining the detection region to exclude the torso, based on the determined position of the torso or head. The position of the torso of the user may be determined using image segmentation, and the position of the head of the user may be determined using face detection. Alternatively, defining the detection region may further include determining a reach of an arm of the user, and defining the detection region to exclude at least a portion of a region of the image unreachable by the arm, based on the determined reach of the arm. Instead, defining the detection region may further include determining an unreachable region of the image not reachable by the object, based on the determined position of the torso, and defining the detection region to exclude the determined unreachable region of the image. The reach of the arm of the user may be based on a determined position of a torso, head or shoulder of the user.

In further examples, the image may be cropped and displayed within the user interface. The image of the user may be centered, where the image may be cropped based on centering the image. A magnification factor that makes the control reachable to the user within the centered image may be determined, where the image may be cropped based on the magnification factor. The magnification factor may be determined using an anatomical model. A face of the user may be detected, an identity of the user may be determined based on the detected face, and the control may be adjusted based on the identity of the user. A position of a second object within the detection region may be detected, and a second control in the user interface may be interacted with based on the detected position of the second object, or the control may be adjusted based on the position of the second object.

In other examples, the image may be captured using a camera. The detection region may be shaped as an arc-shaped detection sub-region above the user, contiguous with two linear detection sub-regions, one on each side of the user. The position of the object may be detected in relation to a guideline mapped within the detection region. A segmented image may be displayed as the representation of the user.

According to another general implementation, a computer readable medium is encoded with a computer program product. The computer program product includes instructions that, when executed, operate to cause a computer to define, in an image of a user within a scene, a detection region surrounding the user, and detect a position of an object within the detection region. The computer program product also includes instructions that, when read by a machine, operate to cause data processing apparatus to interact with a control in a user interface based on the detected position of the object.

According to an additional general implementation, a device includes a processor. The processor is configured, adapted or operable to define, in an image of a user within a scene, a detection region surrounding the user, and to detect a position of an object within the detection region. The processor is also configured to interact with a control in a user interface based on the detected position of the object.

This brief summary has been provided to enable a quick understanding of various concepts and implementations described by this document. A more complete understanding can be obtained by reference to the following detailed description in connection with the attached drawings. It is to be understood that other implementations may be utilized and changes may be made.

BRIEF DESCRIPTION OF THE DRAWINGS

FIG. 9 illustrates the exemplary mapping of gestures to control inputs.

DETAILED DESCRIPTION OF THE INVENTION

Using the enhanced approach described herein, a user may gesticulate by waving or otherwise positioning their arm or arms in the space surrounding their body. A camera takes an image of the user, and a position of the user is determined from the image. Using this position, a detection region is defined around the user where the user's hands or arms are likely to be found if the user intends on inputting a command to a computer application. The hands or arms of the user are detected by examining the defined region, and the position or motion of these detected control objects is used as an input to the computer application.

In one instance, and based on an anatomical model that defines or models the abilities and restrictions of the user's body, the detection region is defined in an area above the user's head and extending out to the side of the user's torso. The position or motion of the detected control objects may be mapped to a cursor, avatar, representation, a mouse event, or other element so as to interact with a control (such as a scroll bar, button, virtual keyboard, drop down menu, or any other widget) on the user interface.

Figure 1:
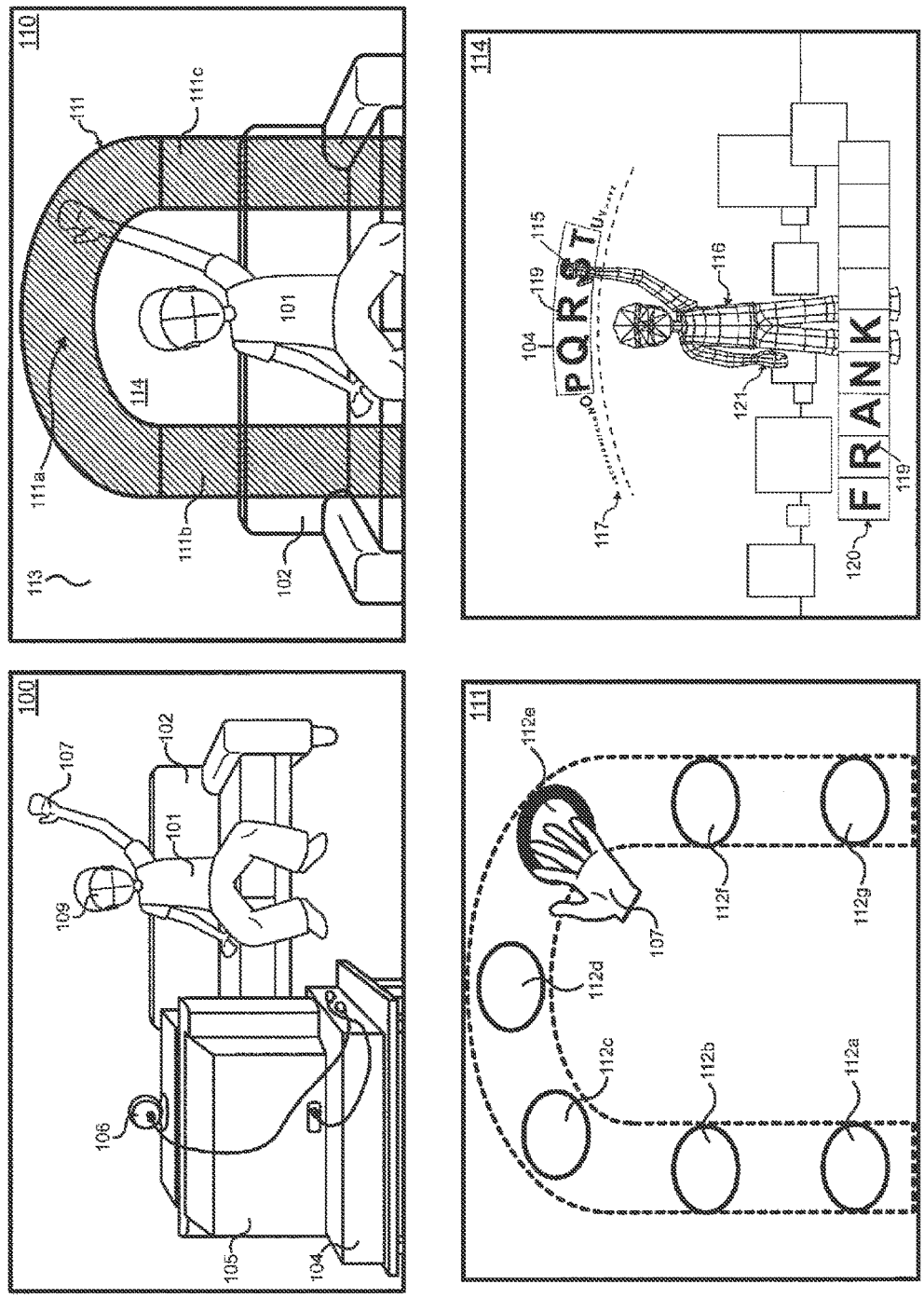
FIG. 1 is a conceptual diagram illustrating enhanced camera-based input.

FIG. 1 is a conceptual diagram illustrating enhanced camera-based input. A scene 100 includes a user 101 sitting on a sofa 102 in front of a set top box 104, watching a television program or listening to music. The set top box 104 is connected to a television 105 and a camera 106. As one approach to interacting with the set top box 104, the user may extend his left hand 107 over his head 109, and an image 110 of a scene 100 is generated using the camera 106. The image may be a single image taken with a still camera, or one or more of a sequence of images taken using a video camera.

Within the image 110 of the scene 100, a detection region 111 surrounding the user 101 is defined. In this example, the detection region 111 includes an arc-shaped detection sub-region 111*a* above the user 101, contiguous with linear detection sub-regions 111*b* and 111*c* on each side of the user 101. The detection region 111 may represents a portion of the image 110 in which little motion other than command input gestures is likely to occur.

For instance, the detection region 111 may exclude a region of the image associated with the user's torso or head, as these regions experience a high degree of motion due to normal body movements not associated with input gestures. Similarly, regions close to the torso where an arm or hand might also occupy while the user 101 moves subconsciously or merely adjusts their own position may be excluded as well. Moreover, regions of the images where the user 101 is physically not able to reach may also be excluded from the detection region 111.

The detection region 111 thus occupies a portion of the image where the detection of a control object within that region would be more likely to signify an intentional gesticulation of a command input by the user 101. In this regard, in later processing operations where the detection region 111 is examined to determine whether a control object lies within that region, these processing operations may be performed on the detection region 111 only or on some portion of the image smaller than the entire image but including the detection region 111.

The detection region 111 may thus be defined within the field of view of the camera 106 where it is possible for the user 101 to indicate, by motion of a body part, that they are performing a command input, signal or gesture. Similarly, however, the detection region 111 may be defined to also exclude a portion of the field of view of the camera 106 where motion occurs so frequently that it would be difficult to discern gestures that are not intended as command inputs, from gestures that are intended to be command inputs.

In this regard, in a setup or calibration operation, a pixel map may quantify, for each pixel in the image, an amount of motion that each individual pixel within the field of view experiences during device operation. Using this pixel map, the detection region may be defined by excluding those pixels which experience motion less than a certain minimum threshold, as these pixels may represent a background or pixels outside of a user's reach. Similarly, the detection region may be defined to exclude those pixels which experience motion more than a certain maximum threshold, as these pixels may represent pixels that experience frequent motion that is not indicative of a command input. Examples of gestures or motions that are not indicative of a command input may include the motion of a user's chest caused by respiration, movements of a user's eye or face while reacting to content, body language, or subconscious body shifting, twitching or jitter.

The detection region 111 may be defined based on an anatomical model. For instance, the height or width of a user's head may be estimated or measured, and the normal reach of the hand of the user may be estimated at three times that measurement. Using this estimation, an arc-shaped detection region may be defined at a distance of between two and three times that measurement away from the user's chest. By this estimation, motions occurring less than this distance, representing body or torso movements, may be ignored, as would motions occurring outside of this distance, representing background movements that are unlikely to be caused by the user's arms.

In this respect, the image 110 includes an unreachable region 113 including those portions of the image 110 that are determined, based on the anatomical model and an assumption that the user's seating position will remain relatively fixed, to be unreachable by the hand 107. The image 110 also includes a torso region 114 occupied by the torso, which is expected to include background objects or motion of the user that is less relevant to or is distracting to the camera-based input than the detected motion or position of other objects, such as the hand 107 detected within the detection region 111. As the camera 106 may remain fixed, the detection region 111 may be mapped onto another image or other images, such as subsequent images, in a straightforward manner.

Upon mapping the detection region 111 to another image, and the absolute or relative position of the hand 107 within the detection region 111 may be detected from the other image. Alternatively, since motion may be easier to detect than position, the motion of the hand 107 may be detected within the detection region 111. Moreover, if the detection region 111 is divided into or defines multiple discrete blocks such as blocks 112a to 112g, an indication of which block is closest to the hand 107 or most obscured by the hand 107 may be output. For instance, if the hand 107 obscures block 112e more than it obscures any of the other blocks, an indication that block 112e is a selected block may be output. The indication may include a unique identifier identifying the block.

Within a user interface 114, the position of the hand 107 within the detection region 111 is mapped to a cursor position, a representation, or a virtual control object, such as a virtual hand 115 of an avatar 116, which interacts with a control 117. In controlling or interacting with the control 117, movements of the hand 107 within the detection region 111 may cause the avatar 116 to be animated, thereby making interaction with the control 117 highly intuitive for the user, and visually pleasing. Through the interaction with the control 117, the user 101 selects the item 119 (the letter "R"), which appears in output region 120 of the user interface 114.

The avatar may be wrapped with a portion of the image 110 that captures the user's physical appearance. By this approach, it would appear to the user 101 that they are within the user interface 114 manipulating or physically interacting with the device. Put another way, the camera 106 may take a texture image of the user 101, and overlay the texture image onto a three-dimensional wireframe that makes up the avatar, giving the avatar the appearance of the user 101.

The mapping of motions of the user 101 to motions of the avatar 116 can occur in a 1:1 relationship, motions can be mirrored, acceleration can be applied, or the motion of the avatar can be forced to particular 'snap to" points. Furthermore, in a velocity mode, a position of a control object within a detection region may also denote a velocity in which the avatar should continue to move until the position of the control object changes. Depending upon the particular configuration desired, for example, the motions of the user 101 and the motions of the avatar 116 can be made to mirror each other, such that a raised left hand 107 of the user causes a right hand 121 of the avatar to be raised.

Figure 2:
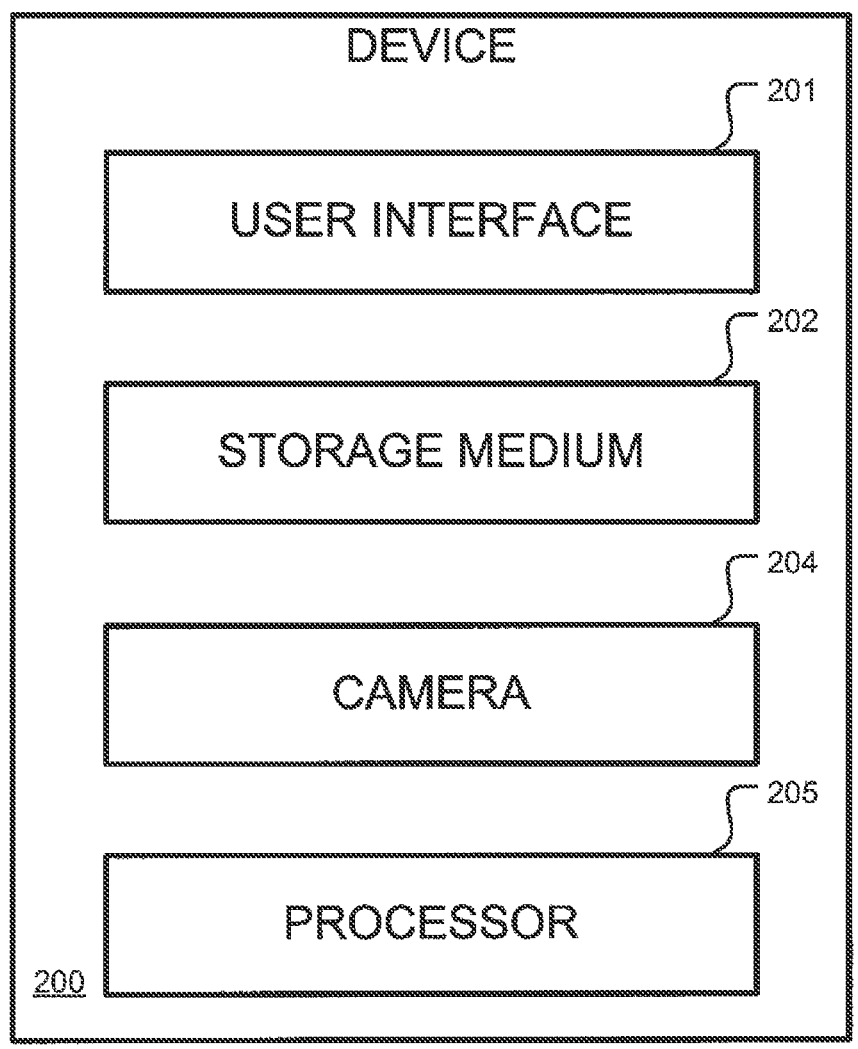
FIG. 2 is a block diagram of a device used to implement enhanced camera-based input.

FIG. 2 is a block diagram of a device 200 used to implement enhanced camera-based input. Briefly, the device 200 includes, among other things, a user interface 201, a storage medium 202, an input unit 204, and a processor 205. Using the device 200, enhanced camera-based input may be used to facilitate interaction with a control of a user interface, for example to allow for selection of the items by a user. Interaction with controls does not require the user to hold any specialized object, such as a retro-reflector, gyroscopic device, or remote control in their hands, but rather intuitively maps arm or hand motions to cursor or other inputs.

The user interface 201 is a mechanism for allowing a user to interact with the device, or with applications invoked by the device. The user interface 201 may effect both input and output, allowing a user to manipulate the device or for the device to produce the effects of the user's manipulation. The device 200 may utilize any type of user interface 201, such as a graphical user interface (GUI), a voice user interface, or a tactile or haptic user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including a control and an object such as an avatar. The storage medium 202 stores and records information or data, and may be an optical storage medium, magnetic storage medium, flash memory, or any other storage medium type.

The camera 204 is a device used to capture images, either as still photographs or a sequence of moving images. The camera 204 may use the light of the visible spectrum or with other portions of the electromagnetic spectrum, such as infrared. For example, the camera 204 may be a digital camera, a digital video camera, or any other type of device configured to capture images. The camera 204 may include one or more cameras. In some examples, the camera 204 may be configured to capture images of an object or user interacting with an application. For example, the camera 204 may be configured to capture images of a user or person physically interacting with an application within the field of view of the camera 204.

The camera may be a stereo camera, a time-of-flight camera, or any other camera. For instance, the camera 204 may be an image detector capable of sampling a background image in order to detect motions and, similarly, gestures of a user. The camera 204 may produce a grayscale image, color image, or a distance image, such as a stereo camera or time-of-flight camera capable of generating a distance image. A stereo camera may include two image sensors that acquire images at slightly different viewpoints, where a processor compares the images acquired from the different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected, over a wireline or wireless pathway, to the camera 204 and the user interface 201, and is configured to control the operation of the processor 205 to provide for camera-based input. In one configuration, the device 200 uses the processor 205 or other control circuitry to execute an application that provides for the enhanced camera-based input. Specifically, the device receives inputs from the camera 204 and processes the received inputs to calculate the position and movement of a representation of a user in the user interface 201, and to interact with a control based on these movements.

In one example implementation, input occurs by using a camera to detect images of a user performing gestures. For instance, a mobile phone can be placed on a table and may be operable to generate images of a user using a face-forward camera. Alternatively, the gesture may be detected or recognized using the camera 204, such as by detecting a "tilt left" gesture using optical flow or some other approach, and using this detected gesture to move a representation of the user left and to select an item disposed on the left side of a control, or by detecting a "tilt forward and right" gesture to move a representation of the user up and to the right of a neutral position, to select an item disposed on an upper right side of a control.

Thus, the camera 204 may also include or be replaced by some other type of input device or module capable of detecting an angular position of the device 200, such as a gyroscope, accelerometer, or an optical flow tracker. In this regard, the camera may be supplemented with or replaced by a tilt-sensor input to perform functions or commands desired by the user. As such, detection of a user's gesture may occur without using a camera. By moving the device, for example, in the same kind of stroke pattern that is visualized on the control on the user interface, the user is enabled to control the same interface or application in a straightforward, intuitive, and visually pleasing and stimulating manner.

Although the device 200 has been described as a personal computer (PC) or set top box, such a description is made merely for the sake of brevity, and other implementations or manifestations are also contemplated. For instance, the device 200 may be implemented as a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, or any other type of electronic device that includes a processor or other control circuitry configured to execute instructions, or any other apparatus that includes a user interface.

Figure 3:
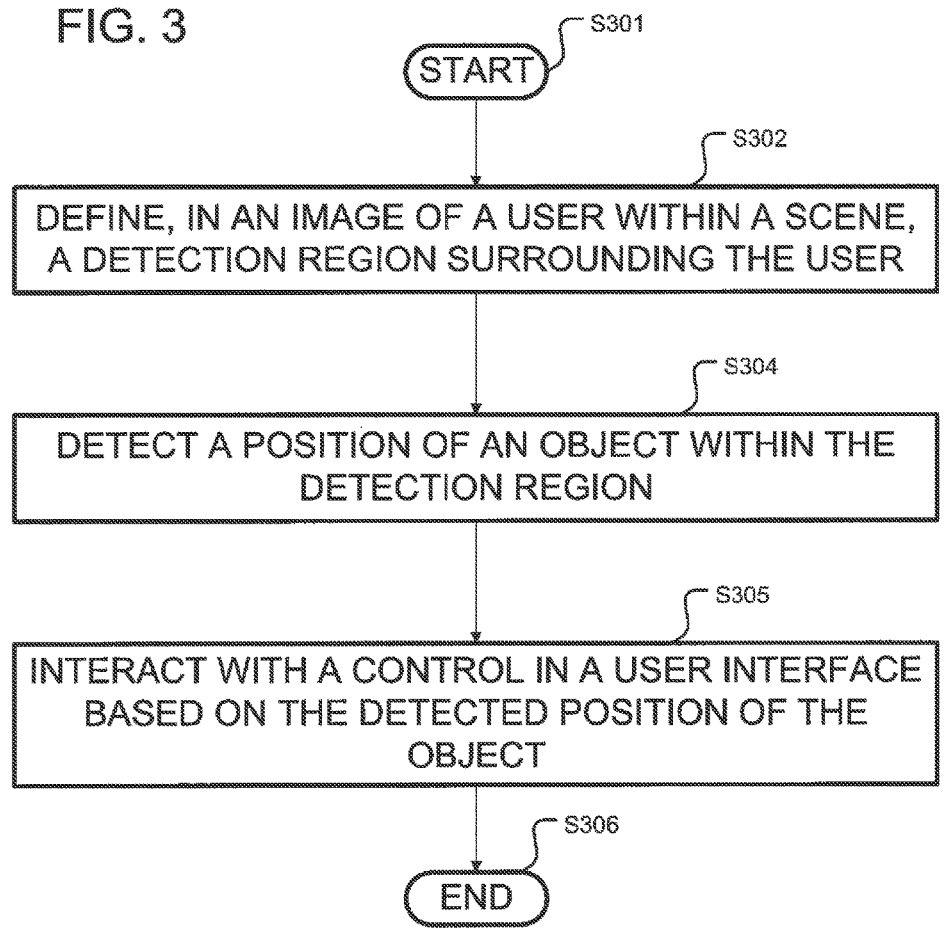
FIG. 3 illustrates an exemplary process that uses enhanced camera-based input.

FIG. 3 illustrates a process 300 that uses enhanced camera-based input, in real time or near real time. A surrounding detection region may or may not overlap the user, including frequently moving portions of the user. Briefly, the process 300 includes defining a detection region surrounding a user in an image of the user within a scene, and detecting a position of an object within the detection region. Additionally, the process 300 includes interacting with a control in a user interface based on the detected position of the object.

Figure 4:
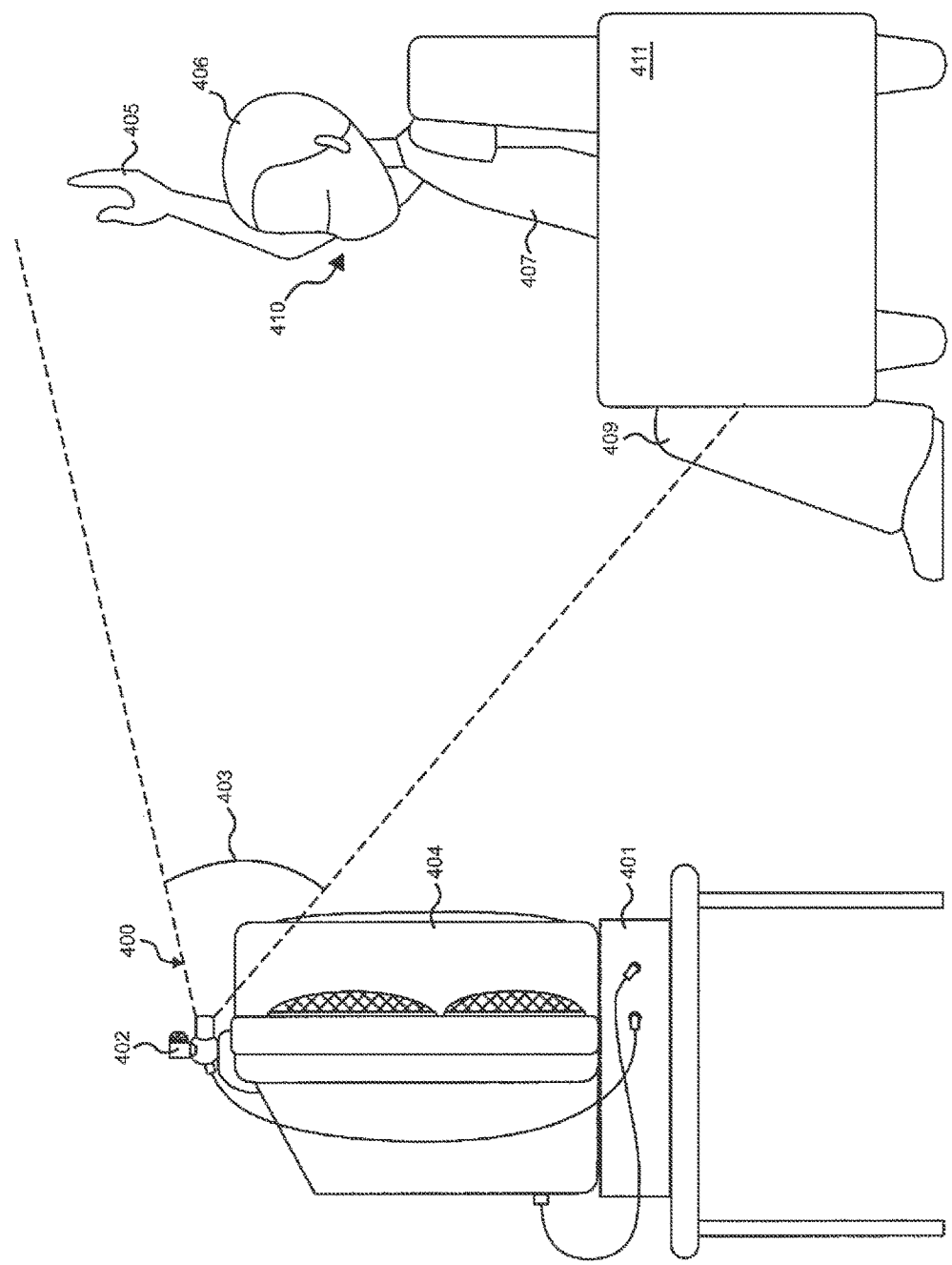
FIG. 4 illustrates an exemplary system used to capture an image of a user.
Figure 5:
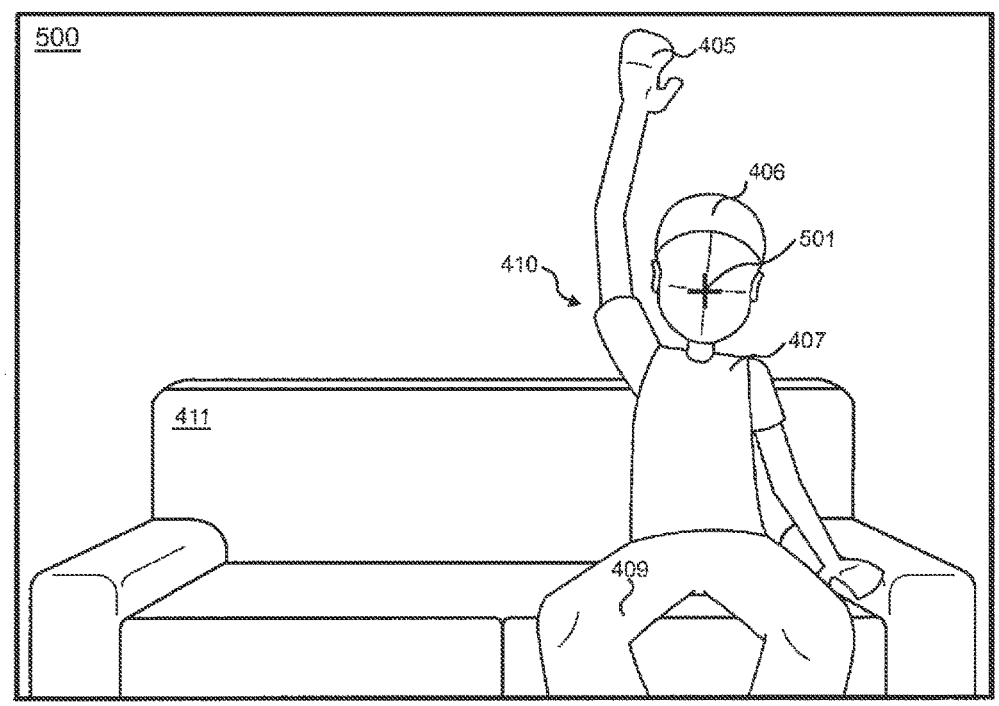
FIG. 5 depicts an exemplary image of the user, captured using the system of FIG. 4.

In more detail, when the process 300 begins (S301), a detection region surrounding a user is defined in an image of the user within a scene (S302). Referring ahead briefly, FIG. 4 illustrates an exemplary system 400 used to capture an image of a user 410 (shown from the side), and FIG. 5 depicts an exemplary image 500 of the user 410 (shown from the front) captured using the same exemplary system 400.

Specifically, the system 400 includes a set top box 401, a camera 402, and a television 404. The camera 402 captures images of a scene within its field of view 403, where the scene includes, for example, an extended right hand 405, a head 406, a torso 407 and a portion of two legs 409 of a user 410, a sofa 411 upon which the user 410 is sitting, and a background behind the user 410 and the sofa 411, such as a wall.

The image 500, which is a still image or one image from a sequence of moving images, may be compressed or stored using one or more of any number of image compression techniques. The image 500 may be a segmented camera image used for touch detection, as well as for determining and displaying a representation of the user in a user interface. Subsequent to capturing the image using the camera 402, the image may be transmitted across a network.

The detection region surrounding the user may be defined following the performance of an engagement gesture by the user. An engagement gesture activates or invokes functionality that monitors other images for gesture-based command inputs, and that ignores, filters or excludes random, unintentional or other body motions that do not define command inputs, or background motions.

As used herein throughout, a "gesture" is intended to refer to a form of non-verbal communication made with a whole or part of a human body or multiple human bodies, and is contrasted with verbal communication such as speech. For instance, a gesture may be defined by a movement, change or transformation between a first position, pose, or expression and a second pose, position or expression. Example gestures include for instance, an "air quote" gesture, a bowing gesture, a curtsey, a cheek-kiss, a finger or hand motion, a genuflection, a head bobble or movement, a high-five, a nod, a sad face, a raised fist, a salute, a swiping or wave motion, a thumbs-up motion, or a finger pointing gesture.

The engagement gesture may be a specific hand pose or hand motion sequence gesticulated in a tracking region of a camera in front of a display that is held for a predetermined amount of time. One example gesture is a hand pose held in an upright position with all fingers and thumb spread apart widely. Another example is a circular hand motion made by extending the user's arm in front of their face, and moving their arm in a circle in front of their head. In essence, an engagement gesture specifies to the device that generates the user interface that the user is ready for further camera-based input to occur. To reduce errors, an engagement gesture may be an atypical gesture, such as a gesture that would not subconsciously be made with body language during an a normal conversation, or a gesture that would not be made in the ordinary performance of normal human activity.

Accordingly, from the two images, the gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. The user's gesture in a single image or between two images may be expressive of an enabling or "engagement" gesture. A control object may also be a physical device, such as an infrared finger light, a retro-reflector, or a remote control.

There are many ways of determining a user's gesture from a camera image. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the pose of the user changes if all five fingers are retracted into a ball with the palm remaining forward and thus a gesture is expressed, even if the overall position of the hand or arm remains static.

Gestures may be detected using heuristic techniques, such as by determining whether the hand position information passes explicit sets of rules. For example, the gesture of "swiping the hand off to one side" can be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

In addition to body, arm, or hand gestures, finger pointing gestures can be recognized from one or more images. For instance, a "point left" gesture can be made with the tip of a user's finger and detected by analyzing an image of a finger. Fingerprint analysis or other approaches can be used to determine the direction of a pointing fingertip. In other example implementations, and as noted above, a gesture can be detected without using a camera, such as where the gesture is a verbal gesture or is detected using a tilt sensor or accelerometer.

In images of the user captured by the camera, the user's arm may be recognized as gesticulating from a downward first position to an extended, palm-facing-forward second position. The performance of this engagement gesture by the user may causes a representation of the user to be displayed within the user interface along with the control. Since, upon performing the gesture, the user may not be centered in the field-of-view of the camera, a realignment, cropping, re-centering, or magnification process may be invoked following engagement.

In one example implementation, the image 500 is a chroma keyed camera image, such as an image acquired of the user 410 who is disposed in front of colored background. A chroma keying process identifies parts of the image 500 whose color matches that of the background, and classifies those parts as background. Parts of the image 500 whose color deviates from that of the background are likely to be parts of the user 410, and are classified as foreground.

In another example implementation, the image 500 is a depth keyed camera image. A depth keyed camera image is typically acquired by a camera capable of determining depth or distance, such as a time-of-flight camera (such as a camera produced by CANESTA INC.®) or a stereo camera (such as a camera produced by TYZX INC.®). With an exemplary time-of-flight camera, an infrared emitter emits a pulse of infrared light, an optical sensor measures the time the light takes to travel to an object and back to the camera, and the distance of the object is calculated based on the time.

With an exemplary stereo camera, multiple optical sensors capture images of a scene from multiple viewpoints. A stereo camera can then compare the multiple images to determine the disparity in the position of objects between the multiple viewpoints and calculates the distance of the object based on the disparity. Parts of an image are classified as foreground and background based on the distance. A classification process may include comparing the distance to a threshold, whereby parts are classified as foreground if the distance is shorter than the threshold, and parts are classified as background if the distance is longer than the threshold. A classification process may also include comparing the distance to a background model, whereby the background model represents the depth of parts of the scene (e.g., floor and furniture) without a user. Parts may be classified as foreground if the distance is shorter than the corresponding part of the model, and parts may be classified as background if the distance is equal to or longer than the corresponding part of the model.

In a further example, the image 500 is using a background color model. For instance, the image 500 may be compared to a background color model representing the expected appearance of the background. A background color model may be acquired by storing an image of the scene without a user. Parts of a camera image are classified as background if the color of the part is similar to the color of the corresponding part of the background color model. Parts of a camera image are classified as foreground if the color of the part is dissimilar to the color of the corresponding part of the background color model.

In an additional example, the image 500 is segmented using a skin color model. For instance, the image 500 may be compared to a skin color model representing the expected appearance of a user's skin. A skin color model may be predefined, and based on a sampled skin color in a large number of images of people. A skin color model also may be defined based on an image of a user's skin. Parts of a camera image are classified as foreground if the color of that part is similar to a color within the skin color model. Parts of a camera image are classified as background if the color is dissimilar to any of the colors appearing in the skin color model.

Furthermore, the image 500 may be a motion image, whereby parts of the image including motion are classified as foreground, and parts of the image that appear static are classified as background. Segmenting a camera image by motion may include acquiring a sequence of camera images, calculating the difference between consecutive images, and comparing the difference to a threshold. Other techniques for detecting motion in one or more images, such as optical flow, may be used.

Although several exemplary approaches have been described above for producing segmented camera images, other approaches or techniques are indeed contemplated and may also be used instead of, in addition to, or in combination with these described approaches.

Since (among other things) the position of the user 410 ("the body position") may be used to later define the position of the detection region, to define the position of a control within the user interface, or to crop or magnify the image, the body position is detected within the image 500. The body position may be a position of the head 406, determined using face detection. Face detection may scan parts of a camera image to detect features that correspond to the appearance of a human face.

The body position also may be a position of an arm of the user, so that all items are within easy reach of that arm, a position of the torso 407, a leg 409, a center of mass or a torso center, or the position may relate to another portion or aspect of the user 410, such as a shoulder position. The body position may be defined as a point, line or as a region or area that includes all or part of the body of the user. For computational efficiency, the body position may be defined as a simple shape, such as a square or a circle. In FIG. 5, for example, the position 501 (illustrated is a plus sign (+)) may be determined, calculated or estimated as the body position.

Figure 6:
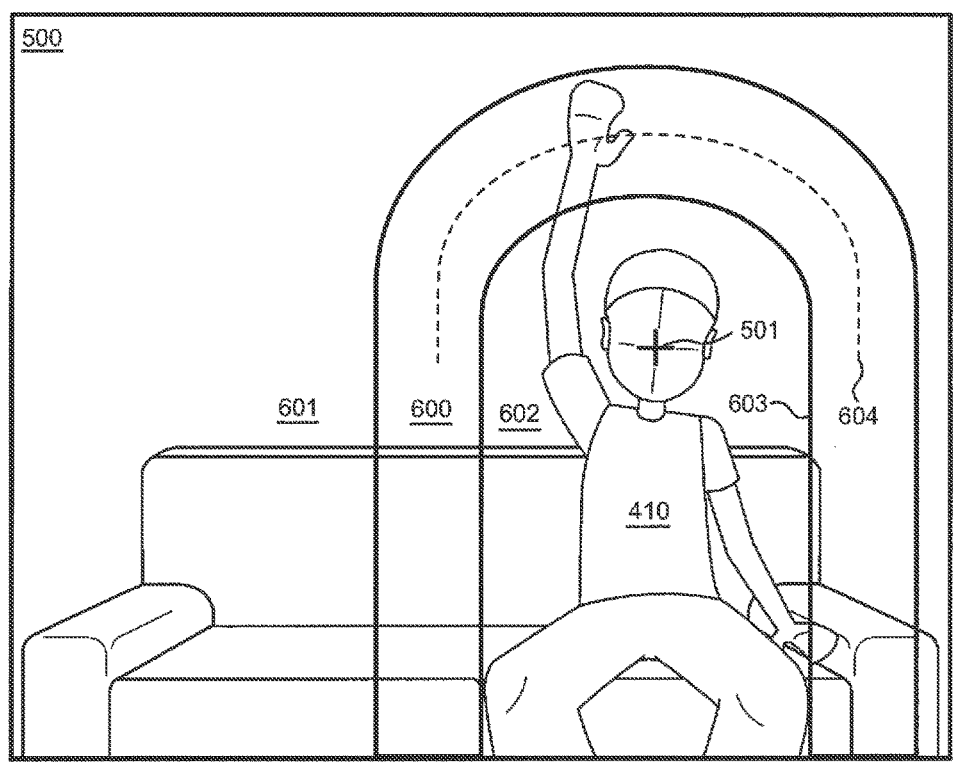
FIG. 6 depicts an exemplary detection region defined within the image shown in FIG. 5.

As shown in FIG. 6, a detection region 600 surrounding the user 410 is defined in the image 500 of the user 410. Generally, the detection region represents the portion of the image where a control object (i.e. a hand or arm) is detected, and thus generally excludes portions of the image 500 where the control object is unlikely to be, and portions of the images where a background, motion, or other factors make finding the control object difficult or computationally expensive. The image 500 is thus segmented into, for example, the detection region 600, an unreachable region 601, and a torso region 602.

The detection region 600 may thus exclude the torso region 602 associated with the user's torso or head, as these body parts move frequently. The torso region 602 also includes the area of the image 500 close to the torso, where an arm or hand might also occupy while the user 410 moves subconsciously or merely adjusts their own position. Moreover, the unreachable region 601 where the user 410 would not physically be able to reach is excluded from the detection region 600. The remaining detection region 600 occupies a portion of the image where the detection of a control object within that region would be more likely to signify an intentional body movement or command input by the user 410. In this regard, in later processing operations where the detection region 600 is examined to determine whether a control object lies within that region, these processing operations may be performed on the detection region 600 only or on some portion of the image smaller than the entire image but including the detection region 600.

The detection region 600 may be positioned according to the range of motion of a user. Range of motion determinations may be based upon complex anatomical models, such as a model that mimics the bio-kinetic restrictions or abilities of a human body and applied these abilities to a user. In some cases, a simpler rules-of-thumb may also be used, such as an approach that estimates that a user's arm may reach a distance equal to a dimension of the user's head multiplied by a multiplier. In other cases, the user's arm reach may be estimated based upon the identity of the user (for example, determined using face recognition) and information stored in the device about the user (for example, the user's age and gender). In any case, the particular positioning of the detection region 600 is defined by some aspect of the user. As such, the user is said to be surrounded by the detection region 600.

The detection region 600 may thus be defined within the field of view of the camera where it is feasible or possible for the user 410 to indicate, by motion of a body part, that they are performing a command input, signal or gesture. Similarly, however, the detection region 600 may be defined outside a portion of the field of view of the camera where motion occurs so frequently that it would be difficult to discern non-command-input motions from intentional command input gestures.

A guide line 604 may be positioned within a detection region 600. For instance, the guide line 604 may be determined as a line parallel to (or in another spatial relationship with) a boundary 603 of the detection region 600. As described in further detail below, selectable items may be arranged along the guide line 604. For instance, in FIG. 10, selectable items 1010*a* to 1010*z* are arranged along a guide line 1009 in user interface 1000.

Figure 7:
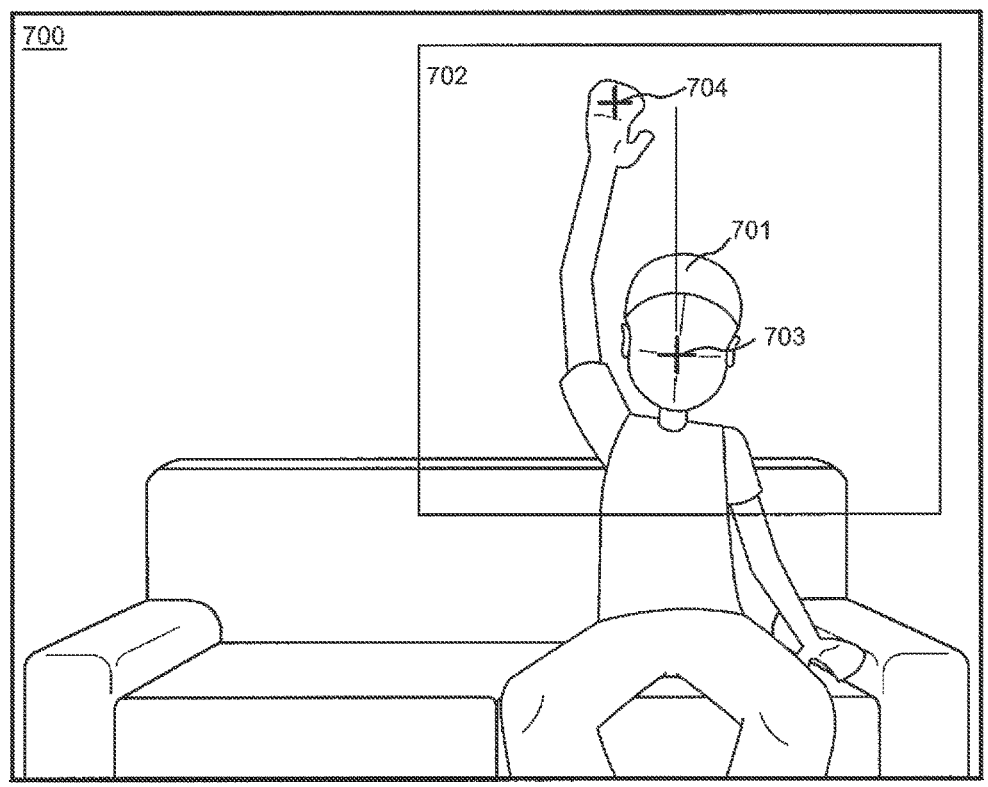
FIG. 7 illustrates the creation of a smaller image by centering and cropping a larger image.

FIG. 7 illustrates the creation of a smaller image by centering and cropping a larger image. Specifically, image 700, which is similar to image 500, has been centered around a head position 703 of a head 701 of the user and magnified, so as to result in cropped image 702. Centering or magnifying certain portions of a camera image can allow movements of a control object (such as hand 704) to be more intuitively or easily mapped to representations of the user within the resulting user interface.

The cropped image 702, or a magnified version of the cropped image 702, may be displayed within the user interface. The image of the user may be centered, where the image may be cropped based on centering the image. A magnification factor that makes the control reachable to the user within the centered image may be determined, where the image may be cropped further based on the magnification factor. The magnification factor may be determined using an anatomical model.

In FIG. 7, the image 700 is panned or zoomed so that a body position is positioned relative to some item, such as a component of the control shown in the user interface. Panning or zooming may be simulated by a process which captures the full camera image 700, and selects a cropped image 702 from the full camera image 700 to be expanded or compressed to fit the display. The cropped image 702 is scaled to fill the display image of the user interface, and the remainder of the full camera image is stored or discarded. As described in further detail below, coordinates, such as coordinates of the body position 703 or the hand position 704 may be correspondingly mapped to features on a representation of the user displayed on the user interface.

The detection region may include an arc-shaped detection sub-region above the user, contiguous with two linear detection sub-regions, one on each side of the user. Although the detection region has been described and illustrated above as being horseshoe shaped, other shapes may also be used based on manufacturers presets or user settings, or the shape of the detection region may be dynamically determined. For instance, the detection region may be circular shaped, only linear, or any other shape including symmetrical or asymmetrical shapes. The detection region may also define multiple, non-contiguous regions, for example to use with a virtual keyboard control (see, e.g., FIG. 40).

Figure 8:
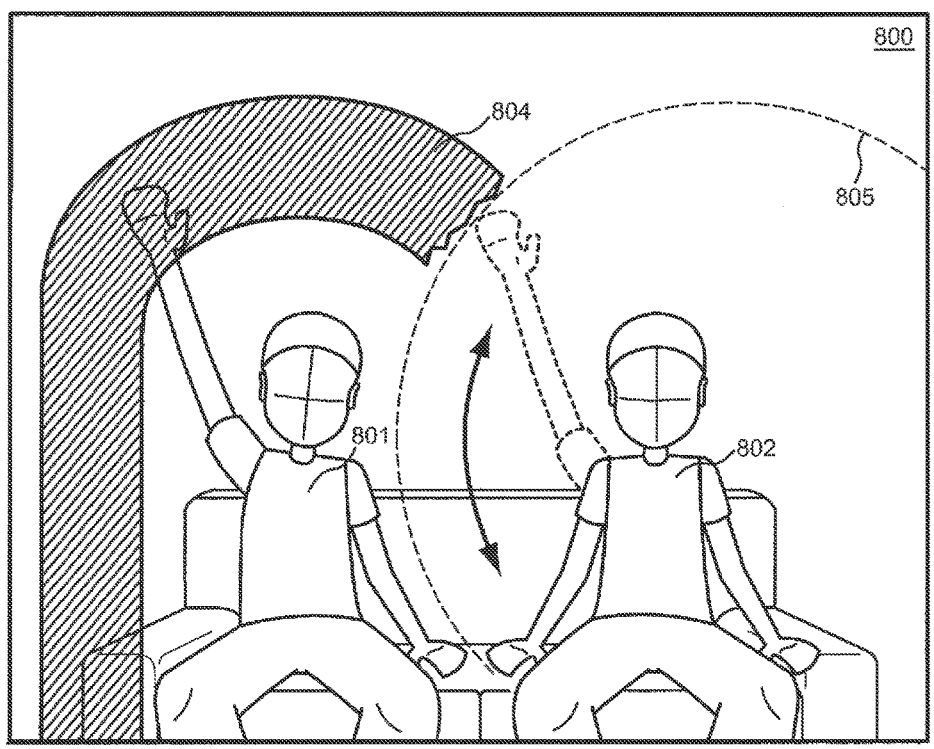
FIG. 8 shows a detection region defined around a controlling user, in a scene which includes two candidate users.

FIG. 8 shows a detection region defined around a controlling user, in a scene which includes two candidate users. Specifically, upon detecting two candidate users 801 and 802 in image 800, a detection region 804 may be defined to take into account the range of motion 805 of the arms of the non-controlling user 802. Put another way, if the non-controlling user 802 (or a control object of the non-controlling user 802) could be detected in any portion of the detection region 804, that portion may be excluded from the detection region. Furthermore, a detection region may be defined for each user within the user interface 800, where the boundaries of each detection region are cropped (or otherwise marked for special processing operations) at areas of the image where overlap of the detection regions would otherwise occur.

As a result, the detection region 804 could take on more complex, dynamically defined shapes. Alternatively, less computationally expensive rules could be applied to an image to define detection regions based upon the subject or scene of the image. For instance, if the user is next to a wall or another person, a linear or other shaped detection region could be defined next to the user on the opposite side of the wall or other person.

Interactive items may be arranged within a detection region 804. The positions and size of items may be calculated so that all items are at least partially disposed within the detection region 804, and may be recalculated so that all items remain within the detection region as the detection region definition is changed, for example to avoid the arms of a non-controlling user 802. Items may be arranged along a guide line within the detection region 804, and the position of items may be animated to move along the guide line so that all items appear within a cropped detection region.

A position of an object (such as a hand) within the detection region is detected (S304). The position of the object may be detected in the same or another image or other images, such as a subsequent image, by applying or overlaying the previously defined detection region over the new image. For example, the detection region can be defined in a region of the scene, or a region of an image. If the camera or user is moving, the detection region can be adjusted from image to image to compensate for this motion. In order to interact with a control in a user interface, a position of a control portion of a user (a "user position") is determined, for mapping to a cursor, indicia, avatar or other representation of the user within the user interface.

The position of the control object may be expressed in several ways. For example, and as shown in image 900 of FIG. 9, the hand position 901 of the user 902 may be expressed as absolute or relative coordinates (x, y), or as an angle $\theta$ or an angle $\theta$ and an absolute or relative distance d from a known point 904 (such as a body position). Furthermore, if the detection region 905 is divided into multiple sub-regions (such as sub-regions 905*a* to 905*h*) or is associated with multiple interaction elements, the position of the control object may be expressed as a unique identifier of the sub-region or interaction element overlapping or most near the hand position 901. In FIG. 9, for example, since the hand position 901 is overlapping sub-region 905*e*, the position of the control object may simply be expressed as an identifier associated with the sub-region 905*e*. Other approaches for expressing position of an object in one, two or three dimensions may also be used.

Determining a user position may include analyzing a segmented camera image, where a camera image is segmented into foreground and background parts. For example, parts (e.g., pixels) of the image likely to represent the user are classified as foreground, and parts unlikely to represent the user are classified as background. Determining a user position using a segmented camera image take into account a part of an image above a guide line, and optionally, may include a short distance below a guideline. A user position may be calculated as the average position of all foreground parts within the region. Determining a user position using a segmented camera image may include counting the number of foreground parts within the region, and comparing the count to a threshold, and classifying a user position as found if the count is greater than the threshold.

Determining a user position using a segmented camera image may also include clustering foreground parts within the region, selecting a cluster, and calculating a user position as the average position of all foreground parts (e.g., pixels) within the cluster. Calculating an average position may include calculating a weighted average, where a part's weight is greater for parts further above a guide line.

By weighting parts that are further above a guide line greater, an average position is more likely to be a portion of the user above the guide line. In some implementations, a system may be configured such that a position of the user interacting with the user interface is, for the most part, below the guide line. In these implementations, the system may be configured to enable a user to select characters by positioning the user's hand overhead and above the guide line. Further, in these implementations, by weighting parts that are further above the guide line greater, the detected average position of the user is more likely to be representative of the tip of a user's hand.

In other implementations, determining a user position using a segmented camera image includes analyzing the shape of foreground parts of a segmented camera image. Analyzing the shape of foreground parts may include identifying the top-most foreground parts, and calculating a user position as the position of the top-most foreground parts. Analyzing the shape of foreground parts of a segmented camera image may alternatively include generating a contour of foreground parts, identifying shape features of the contour, and determining whether the shape features are hands. A user position may be calculated as a hand position.

Furthermore, determining a user position may include analyzing a camera image to identify a user's hands, and determining a position of a hand. Identifying a hand position within a camera image may include comparing parts of the camera image to a skin color model representing the expected appearance of a user's skin. Parts of a camera image are classified as skin if the color of that part is similar to a color within the skin color model. Parts classified as skin are clustered into clusters of parts, and clusters of parts whose overall position and size meet one or more criteria are classified as hands. Various methods of identifying a hand position within a camera image may be used, and it should be understood that other hand tracking methods may be employed.

The user interface may utilize a set of regions. A set of regions may include a region about each item of a set. Determining a touch state of each region may include determining whether any part of a segmented camera image classified as foreground (e.g., the user) is within a region. In other examples, determining a touch state of each region may include determining whether a part of a segmented camera image classified as a user's hand is within a region. The set of regions may include regions about each item of a subset. The set of regions may vary (e.g., move within the display image) based on interactions of the user.

Displaying a representation of a user may include displaying an avatar, the appearance of which is configurable by the user. For example, a user may configure an avatar's gender, size, facial features, and clothing. Displaying a representation of a user may include detecting the identity of a user, and displaying a representation of a user that corresponds to the detected identity of a user. An identity of a user may be detected using facial recognition. A representation of a user that corresponds to the detected identity of a user may include an avatar whose appearance is configured by the user.

Displaying a representation of a user may include displaying a camera image, such as a texture image of the user overlaid onto an avatar. For example, a video image is acquired from a video camera and rendered in a display. A video image may include an image of user and the room the user is in (and other surrounding of the user). A set of foreground graphics, including items of a subset and text, may be rendered over the video camera image, partially occluding the camera image.

Displaying a representation of a user may include displaying a segmented camera image, where the camera image is segmented into foreground and background parts. For example, parts of the image likely to represent the user are classified as foreground, and parts unlikely to represent the user are classified as background.

Displaying a segmented camera image may include rendering only the parts classified as foreground. Rendering only parts classified as foreground may include generating an alpha channel representing opacity, where foreground parts are defined as opaque and background parts are defined as transparent, and combining the camera image with a set of background graphics using the alpha channel.

Thus, the user interface may display foreground elements and background elements. The foreground elements may occlude the background elements. A set of foreground graphics, including items of a subset and text, are rendered over the foreground elements and background graphics, partially overlapping the foreground and background elements. Additional foreground and background elements or graphics may be generated by an application.

A control (such as a key of a virtual keyboard} in a user interface is interacted with based on the detected position of the object (S305), and the process 300 ends (S306). In one example, the control is a virtual keyboard or mouse. In another example, the control may include items aligned with a guide line defined relative to the representation, where the items are displayed without obscuring the representation.

Returning again to FIG. 9, the position of the control object is mapped to a control input. For example, based on inputting the hand position 901 (expressed as (x,y), θ, θ+d, a sub-region or interaction element identifier, or some other indicia) to a look-up table, database, or formula, a cursor position may be determined. In the user interface 910, for example, the cursor position 911 may be expressed as absolute or relative screen coordinates (x',y'), or an angle θ' or an angle θ' plus distance d' away from a known position (such as an avatar body position 912). Alternatively, if the user interface 910 defines multiple regions 914, the output cursor position 911 may identify a unique identifier of the region corresponding to the input sub-region or interaction element identifier. In the illustrated example, since region 914d corresponds to sub-region 905e, the cursor position 911 is shown within the region 914d.

Interacting with the control, then, occurs by invoking functionality associated with the cursor position. The invoked functionality may, for example, choose or select an item near the cursor position, run an application, perform a media hub function, trigger a mouse event, alter the state of the control, or perform any other human-computer input.

The input position parameters (such as x, y, θ, or d) may be the same as, or may be in a 1:1 relationship with, the output position parameters. For instance, the angle θ of the user's arm may be the same as, or mirror the angle θ' of the avatar's arm. In user interface 920, for example, the cursor position 921 is disposed at angle θ relative to the avatar body position 922. The avatar (or a cursor) may thus represent the user, and may be located above, below, or aside a control.

The avatar may be animated to mimic motion of the user, based on the detected position of the object. A face of the user may be detected, an identity of the user may be determined based on the detected face, and the control may be adjusted based on the identity of the user. A position of a second object within the detection region may be detected, and a second control in the user interface may be interacted with based on the detected position of the second object.

FIGS. 1 to 9, above, illustrate that camera-based input may be applied to an enhanced control, such as by mapping the arm movements of a user captured in an image to a cursor or other representation of a user within a user interface. In this regard, FIGS. 10 to 39, below, illustrate a non-limiting example of a type of enhanced control that may be used with or adapted to accept camera-based input. Different controls, such as the controls illustrated in FIG. 40 or others, may also use camera-based input.

Figure 10:
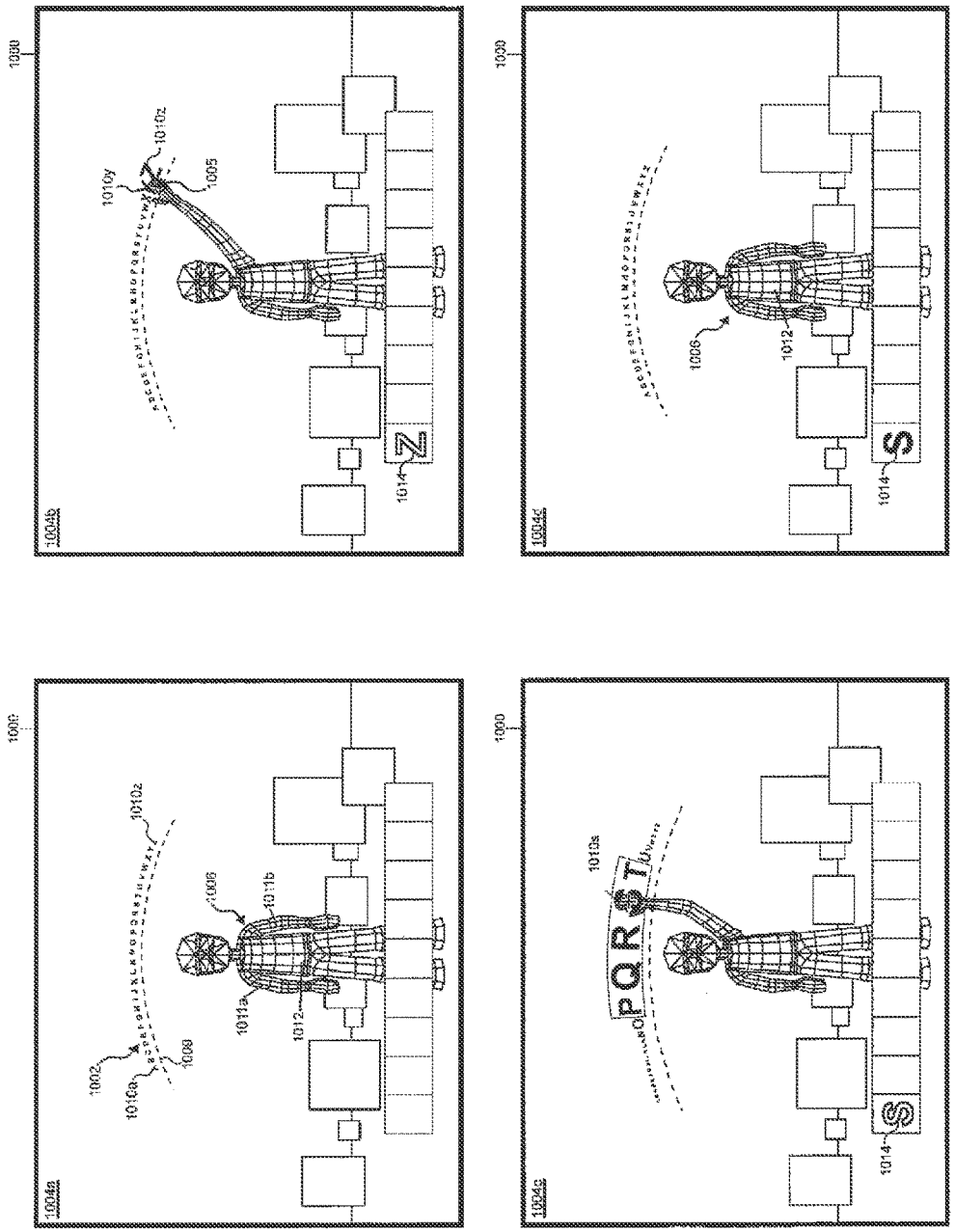
FIG. 10 is a conceptual diagram of a user interface that uses an exemplary enhanced control.

FIG. 10 is a conceptual diagram of a user interface 1000 using an exemplary enhanced control 1002 that uses camera-based input, shown in states 1004a to 1004d. In state 1004a, which occurs prior to the detection of an engagement gesture or after the detection of the engagement gesture but before a control object is detected in the defined detection region, a user interface 1000 includes (among other things) an avatar 1006 and the control 1002 disposed above the avatar 1006. The control 1002 includes a guide line 1009 (shown in state 1004a as a dashed line), and items 1010a to 1010z, which each represent a letter of the English alphabet. Although the items 1010a to 1010z are illustrated as representing letters, they may also represent other things, such as icons, functions, images, objects, symbols, applications, characters, or groups or clusters of like or dissimilar items.

In state 1004a, since the user input has not yet been detected (i.e. the hand or arm of the user has not been detected in a defined region around the user in an image), the avatar 1006 is depicted in a neutral or relaxed position, with the arms 1011a and 1011b of the avatar 1006 relaxed alongside the torso 1012 of the avatar 1006.

The avatar 1006 may have a human-like appearance, and may be able to navigate within a virtual world. Examples of avatars include the playable characters in video games like WORLD OF WARCRAFT® by BLIZZARD ENTERTAINMENT® and virtual worlds such as SECOND LIFE® by LINDEN RESEARCH, INC®. A camera-based input may be mapped to a control portion of the object, such as a hand of the avatar, mirroring or mimicking movements of a user in the space around their body, with movements of the avatar. By taking a texture image of the user with a camera and overlaying the image onto the avatar 1006, the avatar 1006 may have the appearance of the user.

An 'item' is intended to refer to any unit or element that a user may desire to select from a set of units or elements, including but not limited to units or elements that are similar or dissimilar to the item. The set may include as few as no items, or as many as hundreds, thousands or millions of items. In one straightforward example, an item is an alphabetic character, and the set of items includes the twenty six letters in the English alphabet, or fifty two case sensitive letters. Similarly, the set could be made up of or include symbol characters, such as the symbols !, @, #, $, %, ^, &, *, (, ), {,}, <, >, :, ;, ', ", ?, /, ~, ', or other symbols that are not typically accessible via a keyboard or keypad selection. Other sets could include names, such as personal names or place names, selectable from a list of names, icons, functions, or settings, such as media settings (e.g. 'Play,' 'Volume Up,' 'Power Off,' 'Record Series,' etc.).

In this regard, items may include the numbers (0 through 9); letters (e.g. letters A through Z of an English alphabet, or kana characters from Japanese script); text symbols (e.g., space " ", hyphen "-", period "."); predefined or dynamically determined text phrases (e.g., ".com", ".org", "FAQ", "Main Menu", "Send", "Accept Call", "Play DVD", "Power Off", etc.); names; titles; times; dates; operations, events, processes, or functions (e.g., "Save Game", "Load Game", "Start Application", "Transmit Data", "Media Player", "Photo Viewer", "Paint Brush", "Email", "Map"); configuration options (e.g., "640×480 resolution mode", "800×600 resolution mode", "Expert Mode", "Novice Mode", "Training Mode", "Cheat Mode"); or any other information or combination of information.

State 1004*b* occurs when a control object of the user, such as a hand, is detected in the defined region around the user. This position is mapped to a cursor position, illustrated as a plus symbol, that travels over a region of the user interface 1000 occupied by item 1010*z*, and thus defines a condition similar to a mouseover condition. Upon detecting the mouseover condition, the arm 1011*b* of the avatar 1006 is animated to appear as if the avatar 1006 is pointing at or grabbing the item 1010*z*. Furthermore, the item 1010*z* becomes highlighted when its size is increased, as does adjacent item 1010*y* to *a* lesser extent. The mouseover condition over the item 1010*z* also causes the item 1010*z* to be output, such as by displaying the item 1010*z* in output region 1014, or by using a text-to-speech converter to pronounce item 1010*z* using a speaker. The mouseover condition may thus place an associated item in a pre-selected, activated or highlighted state, although the pre-selection or highlighting of an item does not strictly require the item to change its appearance.

The user interface 1000 transitions to state 1004*c* when the user, in the space around their body, moves his extended hand closer to a position within a defined region above his head, and when this more vertical position is detected. This hand position is mapped to a new cursor position along the guide line 1009 over item 1010*s* of the control 1002. The arm 1011*b* of the avatar 1006 is animated, and follows the movement of the user's hand in space. As the representation of the user approaches items or crosses the guide line 1009, the approached items become highlighted by increasing size, and as the representation travels away from a highlighted item, the item reduces size.

The activated item 1010*s* may be output when the user selects a physical button, or performs another selection gesture (such as a gesture performed with his other hand, or by changing his hand pose). Selection may also occur by hovering the representation over the letter for a predetermined period of time, or by selecting a keyboard key while a tabbed cursor is positioned over the letter. Selection (or potential selection) of the letter may cause the item to become highlighted, thereby distinguishing letters from one another along the guide line. An avatar or other object that is used for defining the position of the guide line may itself interact with the items, as in the case where movement of the user is mapped to motion of the arm 1011*b* the avatar 1006.

In state 1004*d*, the item 1010*s* has been selected. Upon selection, the items return to their original, non-highlighted condition. Furthermore, the arm 1011*b* of the avatar 1006 has returned to its original, relaxed position adjacent to the torso 1012. The selected item 1010*s* is output, for example in the output region 1014.

As shown in the various states, the enhanced control may be used to facilitate the selection of a letter or letters from amongst a group of letters that make up an alphabet. By orienting or aligning these items along the guide line, they are displayed so as to not overlap, block, or otherwise obscure the avatar or other object, to thereby allow for intuitive selection of the items by a user.

Using the device illustrated in FIG. 2, an enhanced control may be invoked, output, and used. Briefly, this process may include defining a guide line relative to an object in a user interface, and displaying items aligned with the guide line without obscuring the object. Also, a selected item may be output based on receiving a selection of one of the displayed items.

In more detail, a guide line may be defined relative to an object in a user interface. This may begin when the user manually indicates that the enhanced control should be displayed, or when it is determined that an item are items are to be input, such as where a user advances to a text input field. Since, by increasing the size of highlighted items, the enhanced control may be used to display more items along the guide line that would ordinary fit within the user interface if all of the items had equal dimensions, definition of the guide line may also begin after a determination is made that all the items cannot be displayed effectively within the user interface without using the enhanced control. In doing so, the enhanced control provides for the display of a subset of the items at a sufficient or effective size to permit easy and reliable user selection of a particular item.

Figure 11:
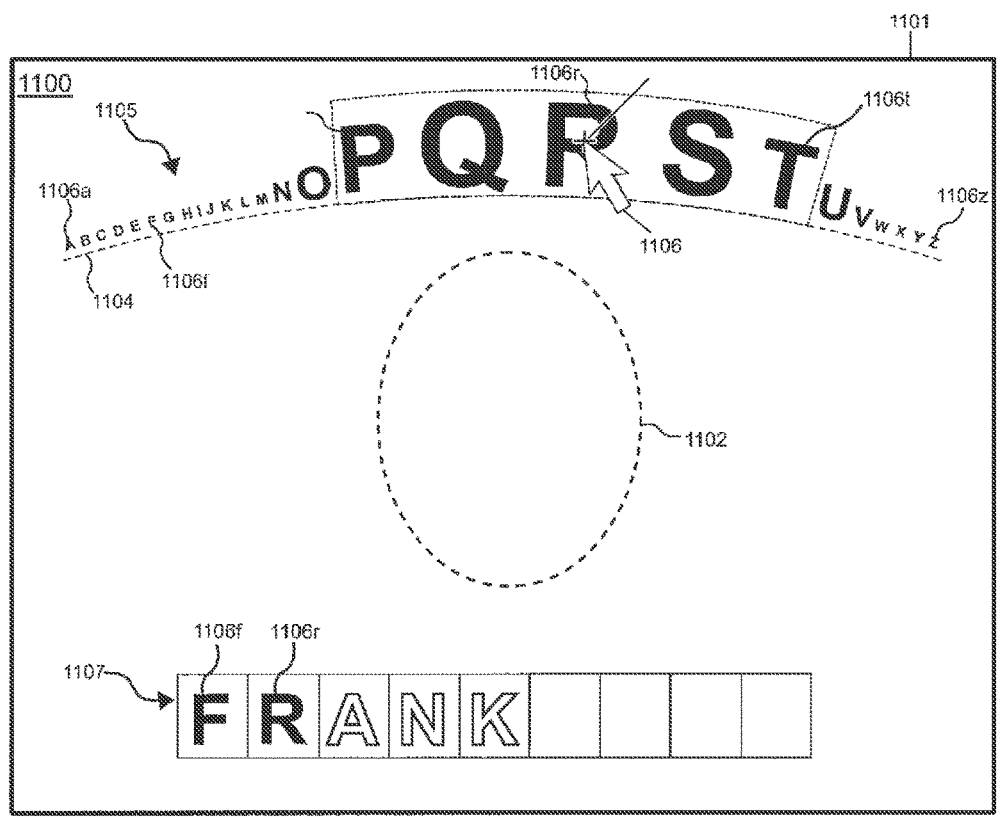
FIG. 11 illustrates a user interface that includes an object and an exemplary enhanced control that further includes a guide line.

Referring ahead briefly, FIG. 11 illustrates a user interface 1101 that includes an object 1102 (depicted as a dashed circle), and a control 1105 that further includes a guide line 1104. Although the guide line 1104 is illustrated as a dashed line in FIG. 11, in other example implementations the guide line 1104 is depicted as a solid line, or is not depicted at all.

The control 1105 allows for the intuitive selection or output of items, such as letters 1106, while at the same time allowing for the display of a portion or the entirety of the object 1102 in a region adjacent to, near, partially or completely bounded or surrounded by, or otherwise defined by the guide line 1104. When it is determined that the items are to be output or selected, such as when a user selects an input field that calls for the entry of text data, the control is positioned in a location in the user interface 1101 that allows for the display of the items 1106 and the object 1102, and is thus defined relative to, in relation to, based on, or with regard to the object 1102. Put another way, the position of the object 1102 may represent an anchor position, in relation to which the guide line 1104 and other elements of the control 1105 may be oriented or aligned, or with respect to which the other elements may be positioned.

In order to determine this anchor position, the object by which the guide line 1104 is to be defined, and the position of that object, are determined. In some cases, the object may be predetermined or predefined, such as where the control 1105 is output in conjunction with or includes an avatar, image of a user, knob, icon, list, table of data, graph of data, text entry field, another control or widget, or known blank region of the user interface 1101. In other cases, the object is dynamically determined at the time when the control 1105 is to be output, such as where the user tabs to a text field and the text field is used as the object, where a blank region of the user interface 1101 is located based on the current state of the user interface 1101, where a biggest, predominant, most or least colorful object on the screen is dynamically determined to be the object, or where an in-focus element, region or window is dynamically determined to be the object.

In these and other cases, the size, shape, position, boundaries or other contexts of the object 1102 are detected, and the guide line 1104 is defined in relationship to these detected contexts. For instance, the guide line 1104 may be defined to have an overlapping or non-overlapping relationship with the object or a portion of the object, a bisecting relationship, a dividing relationship, a space constrained or limited relationship, or any other relationship, such as a relationship based on size, shape, proportion, or an anatomical model of the object 1102.

In summary, and among other things, the user interface 1101 includes an object 1102, which may be a representation of the user, and items 1106 that make up a set of items. The items 1106 may be displayed in a dynamic fashion, such that the items 1106 are displayed in a size and position that permits the user to conveniently and reliably select each item. Since it may otherwise not have been possible to fit each of the items 1106 within the user interface 1101 or aligned with the guide line 1104 in a large size, a subset of the items 1106 may be rendered in that larger size.

Figure 12:
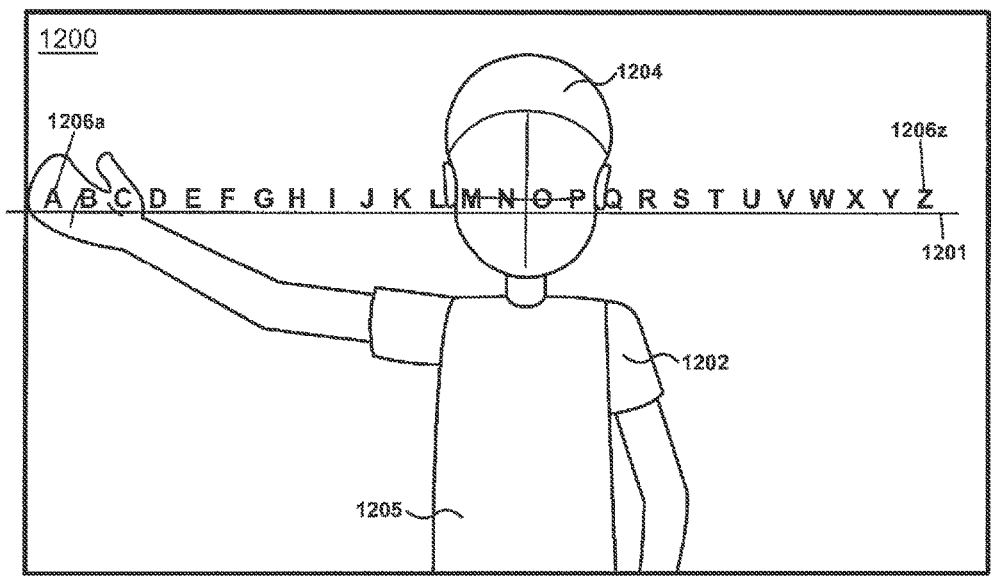
FIGS. 12 to 19 illustrate example guide line arrangements and example relationships between guide lines and objects.
Figure 13:
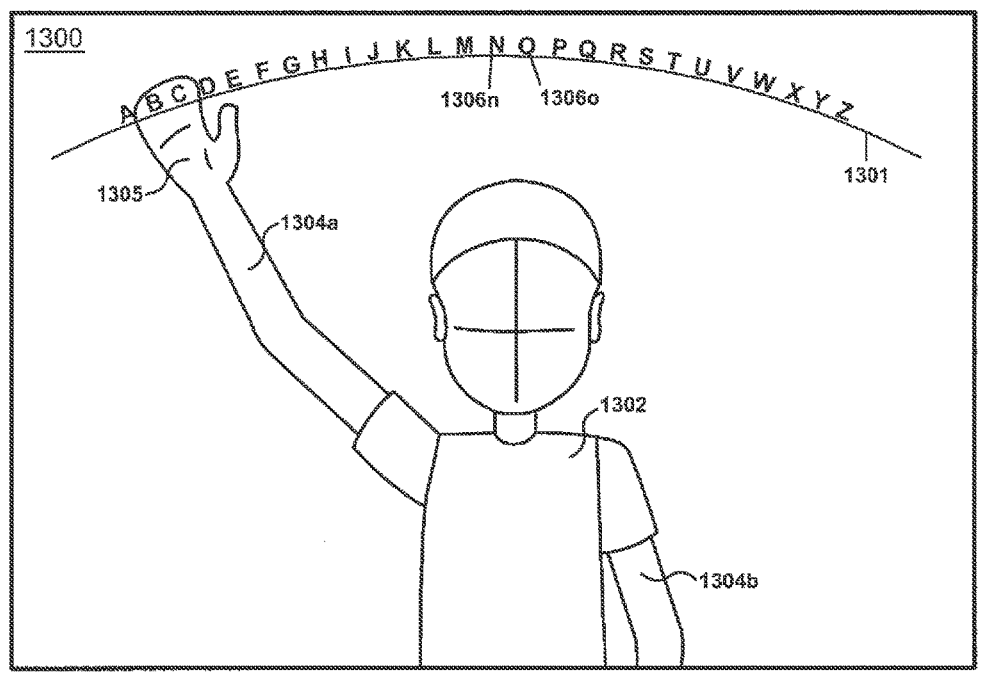

FIGS. 12 and 13 illustrate example guide line arrangements and example relationships between guide lines and objects. In FIG. 12, a guide line 1201 is straight, and is defined to overlap an object 1202, or to divide a top third of the object 1202, or to separate a head 1204 of the object from a torso 1205 of the object 1202. In FIG. 13, a guide line 1301 is curved, and is defined to peak a certain pixel distance above the object 1302, or to not obscure the object 1302, or to be within a range of motion of the arms 1304 (or other control portion) of the object 1302.

The guide line may be defined with respect to the object so that items aligned with the guide line are within reach of the object. As illustrated in FIG. 13, the curved guide line 1301 forms an arc shape, so that any individual item or subset of items can be reached by one of the extended arms 1304 of the avatar 1302. In some cases, the radius of curvature of the curved guide line 1301 may be determined based on the length of the arms 1304 of the avatar 1302, such that the position of the curved guide line 1301 corresponds to a natural wave of one of the arms 1304 when one of the arms 1304 is in an extended, overhead position. In other cases the radius of curvature of the curved guide line 1301 may be determined based on the range of an input device (for example, the range of tilt angles of a tilt sensor, or range of motion of a directional pad on a video game controller). In other cases the radius of curvature of the curved guide line 1301 may be determined based on the range of motion of the user (for example, dependent on the length of the user's arms). Determining the range of motion of the user may include detecting the identity of the user (using face detection) and estimating the particular user's range of motion based on the user's age, gender, or other information about the user.

Although the guide line has been described as being below items, where a cursor moves above the guide line to select an item, other layouts and configurations are possible. For example, a guide line may be positioned above the selectable items or to a side of the selectable items, and may be horizontally, vertically or diagonally oriented.

In addition to the straight and curved guide lines illustrated in FIGS. 12 and 13, the guide line may take on a zigzag, circular, polygonal, or any other shape. A starting point and an ending point of the guide line may be aligned horizontally or vertically, or these points may not be in any type of alignment. A guide line may be circular and continuous, whereby a guide line has no defined starting or ending point (or the appearance of no starting or ending point), or where the starting point and ending point are coincident. The guide line may itself be a moving or animated object, such that items aligned along the guide line are constantly or intermittently moving or animated themselves.

Range of motion determinations may be made based upon complex anatomical models, such as a model that mimics the bio-kinetic restrictions or abilities of a human body and applies these abilities to an avatar or user. Simpler rules-of-thumb may also be used, such an approach that estimates that an avatar's arm may reach a distance equal to a dimension of the avatar's head multiplied by a multiplier. In any case, the particular positioning, orientation, alignment, or configuration of the guide lines are defined by some aspect of the object. As such, object 1302 is said to be surrounded by the guide line 1301.

Based on the position of the object, the guide line may be dynamically defined to surround a portion of the determined position. If the object, or a portion of the object, lies within a circle, and the guide line defines an arc that is any portion of that circle, then the guide line may be said to surround the object. As shown in FIG. 13, for example, if extended, the guide line 1301 would form a circle that would surround a majority of the object 1302, with the exception of a small region representing the fingers of the object 1302, which would lie outside the circle.

Figure 14:
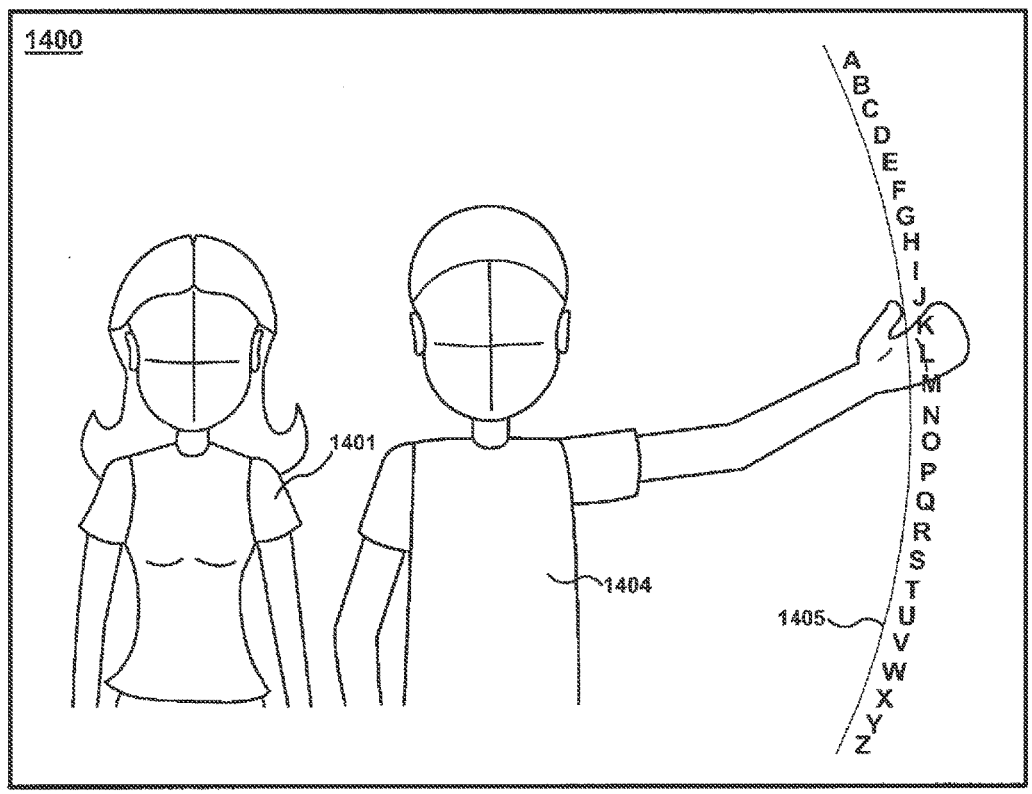

As the definition of the guide line may be dynamic, the guide-line may be redefined in real-time or in near-real-time, such that the user may perceive or observe the redefinition or relocation of the guide line. For instance, the guide line may initially be defined above the object, as shown in FIG. 13, upon detecting that no other objects are adjacent to the object. As shown in FIG. 14, if a second object 1401 enters the user interface 1402 on the left side of the controlling object 1404, the guide line 1405 may be redefined or otherwise repositioned to move away from the second object 1401, or be dynamically defined on a side of the control object 1404 opposite to the second object 1401. A second object may correspond to a second user in a camera image, an avatar of a second user controlled over a network, an avatar of a non-player character controlled by a program, or another type of object. Such a feature may advantageously allow the enhanced control to be more efficiently utilized in non-static user interfaces that have multiple moving objects.

Defining the guide line may further include determining a range of motion of a control portion of the avatar, and defining the guide line within the range of motion of the control portion, where the guide line may be defined along an outer edge of the range of motion of the control portion. For instance, the radius of curvature of the vertically oriented guide line 1405 may be determined based on the length of the arm of the avatar, such that the position of the vertically oriented guide line 1405 corresponds to a natural wave of the arm of the avatar when the arm is in an extended position to a side.

Figure 15:
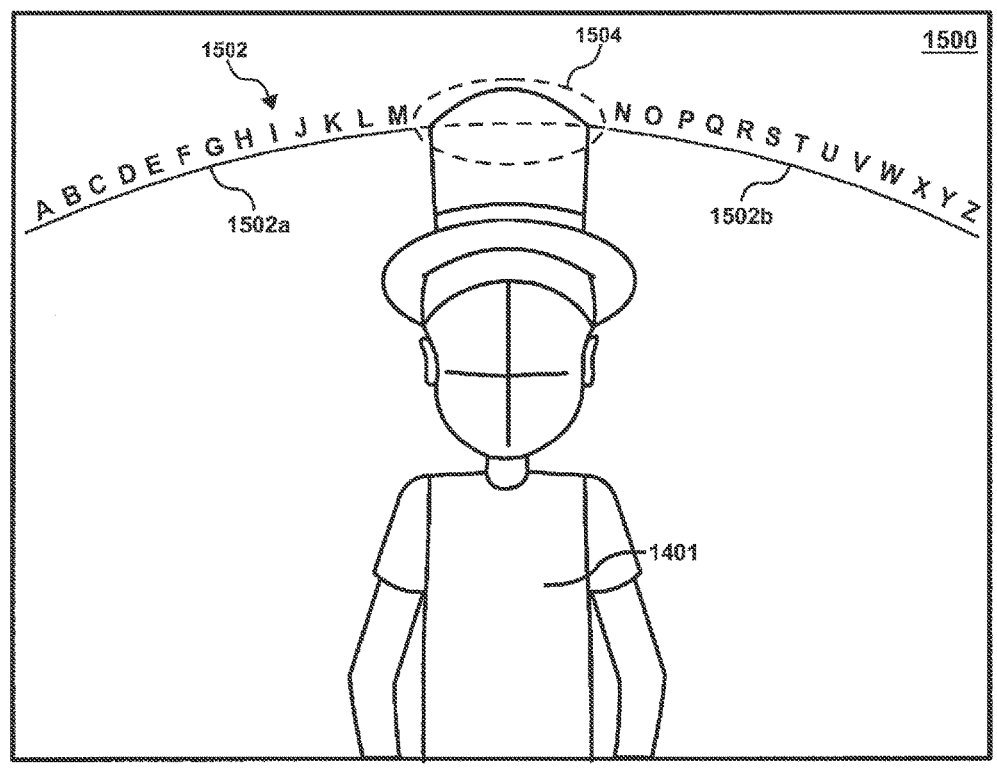

In an further example, such as where the number of items is too large to be associated with a single guide line, or where the user interface is crowded with other elements, each item may in fact represent multiple items or clusters of items, or the guide line may be divided into parts and my thus define discontinuous portions, or multiple guide lines may be defined. In FIG. 15, since the user interface 1500 includes an object 1501 that occupies nearly its entire vertical length, the guide line 1502 is defined with a discontinuous portion or region 1504 (illustrated as a dashed line), effectively dividing the guide line 1502 into guide line portions 1502a and 1502b.

Figure 16:
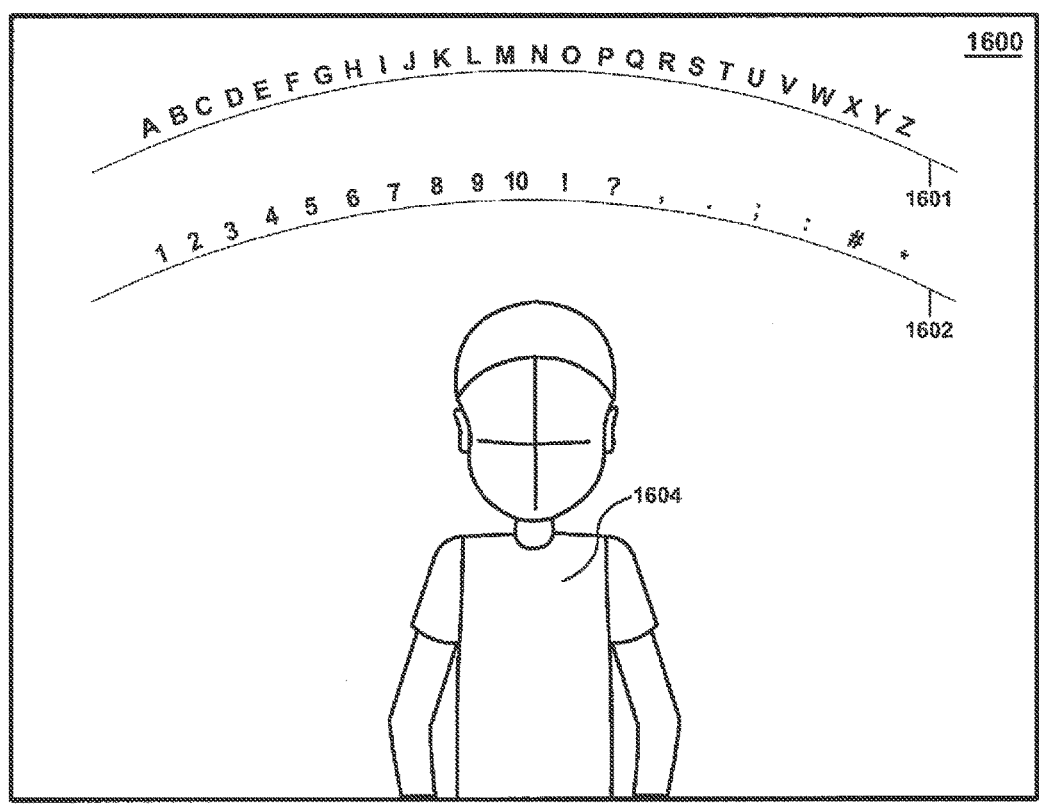

In FIG. 16, since the number of items to be selected or output is large and could possibly make display or selection of the items on a single guide line difficult or counter-intuitive, two guide lines 1601 and 1602 are defined within the user interface. Although guide lines 1601 and 1602 are illustrated as having the same general shape and being parallel, neither characteristic must apply. For instance, the guide line 1601 may be a zigzag shaped guide line that is generally aligned vertically along the left side of the object 1604, and the guide line 1602 may be a hexagonal guide line that is defined to overlap a torso of the object 1604 itself, or a circular guide line that completely surrounds the object 1604 on all sides.

A selection of an item on a first guide line may spawn the definition of or display of items aligned with a second guide line, such as where the first guide line is used for the selection of an alphabetical character, where names (or other item types) that start with an alphabetical character displayed on the first guide line are displayed or otherwise output on the second guide line once the alphabetical character has been selected.

Instead of defining the guide line relative to the object, the guide line may also be defined or positioned based on the bounds of the user interface. For instance, a guide line may be defined to extend from one edge (or a point near one edge) of a user interface to an opposite edge (or a point near the opposite edge). The guide line may be defined or positioned based on the positions or other components of the user interface, for example, relative to a desktop icon, a user interface button, or an object within a virtual world. The guide line may be symmetrical or asymmetrical with regards to the boundaries of the user interface.

Items aligned with the guide line may be displayed, with or without obscuring the object. Items may be aligned with the guide line if a bottom, middle, right, left, center, or other portion of each item is on the guide line, or is disposed parallel to a point on the guide line that corresponds to the item. In FIG. 11, for example, items 1106a and 1106z are each in alignment with the guide line 1104 since portions of the respective items are parallel to the guide line 1104, even though the items 1106a and 1106z are not strictly in alignment with each other. When displayed, the aligned items 1106 as a whole take on the general shape or look of the guide line 1104 itself. FIG. 12 also illustrates items aligned with the guide line 1201, although first item 1206a and last item 1206z are also generally in alignment with each other since the guide line 1201 is straight.

Figure 17:
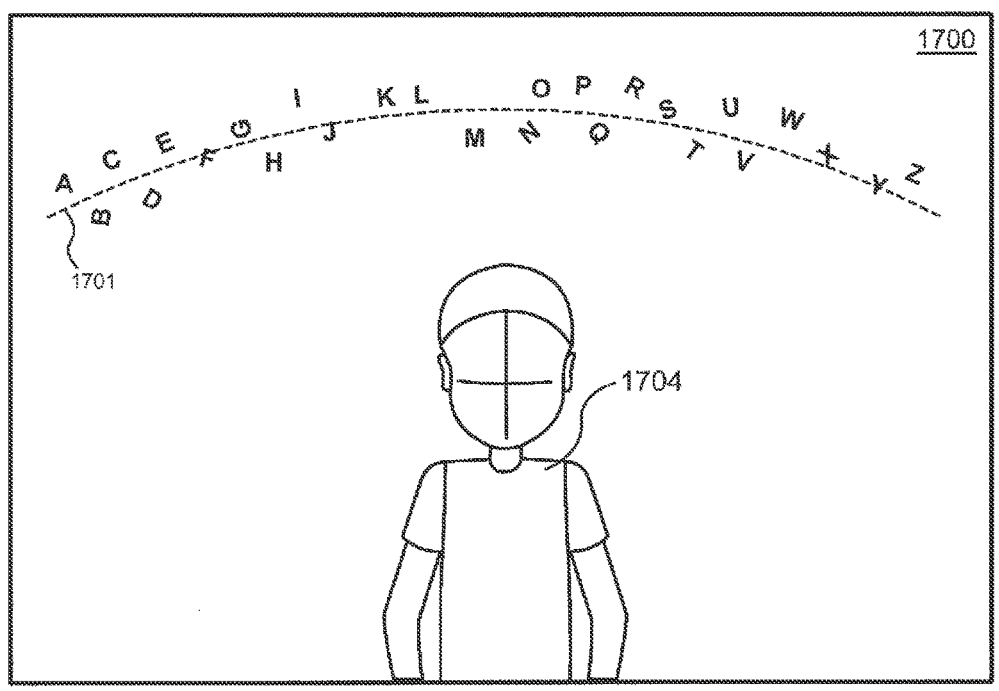

As shown in the user interface 1700 of FIG. 17, in the case where the center or other internal point of each item is aligned with the guide line 1701, each item may be rotated around its center to give the displayed items a less uniform, or more randomized look. This randomization may be further emphasized by offsetting the items above and below a guide line (or some other line parallel to the guide line), such that some items appear above the guide line and some items appear below the guide line, although the aggregated items are generally still aligned with, or take on the general look, feel, orientation, arrangement or disposition defined by the guide line.

The items may or may not be evenly distributed along the guide line. For instance, the items may initially be evenly distributed, and then unevenly redistributed when a cursor hovers over a particular item and that item is re-sized. Alternatively, default or preferred items may be distributed along the guide line to appear more prominent than other less preferred items. Further, the spacing between items can be defined by a pattern or mathematical function, or may be completely randomized.

Since the object or at least a portion of the object is visible when the items are displayed, the object is deemed to be non-obscured. Put another way, by displaying the items without obscuring the object, the items do not completely overlap or block the visibility of the object. Certain characteristics of the items, such as the transparency, color, or line thickness of the items can be altered (or selectively altered, for example where the items would otherwise overlap the object), to make the object more or less visible.

The items may be displayed without obscuring the object at a first point in time, such as a time where the items are initially displayed, and the items may obscure, occlude, obfuscate, block or overlap the object or a portion of the object at a second point in time that is earlier or later than the first point in time. By way of example, FIGS. 12 and 13 each illustrate items that are displayed without obscuring the respective objects, since at least a portion of the respective objects is visible in the user interface. In a further example, FIG. 16 illustrates items that are displayed without obscuring the associated object, since no portion of any item overlaps, blocks or interferes with the visibility of any portion of the associated object within the user interface.

A selection of one of the displayed items may received, for example using a mouse or a camera input. In one implementation, a user interface may define a region around each item, where an item is selected if a cursor or control portion of an object is detected is within the item's associated region. The regions may be dynamically refined based upon user interactions, for example to increase in size based on a mouseover condition or upon detecting that a cursor has crossed the guide line, or to decrease the size of the region when a cursor is far away, is highlighting a different item, or has re-crossed the guide line.

As described in more detail below, the selection of an item may occur via several approaches, depending upon the type of input unit that the user uses to effect the selection. For instance, the selection may be a cursor-based user selection using a mouse, in which the user positions or hovers a mouse's cursor over an item to be selected (causing a mouseover event), presses down a mouse button (causing a mousedown event), and releasing the mouse button (causing a mouseup event). Other mouse events, such as a click event, a double-click (dblclick) event, or a mouseover event alone may also be used to select an item using a mouse.

Using a keyboard, a user may tab from one item to another, and select another keyboard key (e.g. a spacebar or the return key) to select a highlighted item, or the user may begin typing characters to narrow down or identify a desired item to select. Using a video game controller or handheld remote control, a user may press a directional pad to change which item is highlighted, and press a button to select the highlighted item. Using a mobile device with a tilt sensor, the user may tilt the device left, right, up or down to move a cursor or other indicator left, right, up or down until a desired item is highlighted, and then press a key or shake the mobile device to register the selection. Using a touch screen device, the user may directly touch the X and Y coordinates of the user interface where the desired item is output. Using a voice interface, the user may say commands such as "tab," "left," "right," "select," or other similar voice commands move a cursor between items, and select a desired item.

A user may directly control an avatar using a mouse or video game controller. For example, using a video game controller, a user may move an analog control stick to move the avatar's arm, whereby the angle of the analog control stick is mapped to an angle of the avatar's arm. A user may directly control an avatar using a motion capture device, whereby the avatar's arms mimic the user's real arm motions.

The enhanced control described herein is compatible with video based control systems. Specifically, a camera may detect an image, such as an image of the user, and portions of the image, motion within the image, or identified gestures from the image may be dynamically mapped to a cursor, in real time or near real time. For instance, a detection region surrounding a user may be defined in an image of the user within a scene, and a position of an object (such as a hand) within the detection region may be detected. The enhanced control to be interacted with based on the detected position of the object.

Although further description of other input mechanisms, approaches or techniques are omitted for the sake of brevity, it suffices to say that an item may be automatically or manually selected using any conceivable approach, technique or mechanism.

The object may be a representation of a user, such as an avatar. By displaying a representation of the user in the user interface, training requirements are reduced since the user may easily recognize the object's position relative to the position of the items, and may quickly move a position of a cursor or control portion of the avatar (such as a hand) to be coincident with the position of a desired item. In this regard, the position of the cursor or control portion of the avatar is used to detect selections or 'touches' of items displayed in the user interface.

In the case where the object is an avatar, potential control portions of the avatar may be designated as a control portion to be animated. For instance, a control portion may be one or more arms, legs, elbows, knees, hands, or fingers of the avatar; or the head or torso of the avatar, or bodily features of the avatar such as a nose, eyes, ears, belly button, neck, or hair; or clothing, accessories or other accoutrements of the avatar such as clothing, jewelry or other personal items. As user inputs are received, the designated control portion is animated so as to interact with, or to give the appearance of interaction with, the items.

In the case where the object has the appearance of a knob or switch, a control portion may be an arrow that extends from the body of the object, and the object may rotate to point towards an item. In the case where the object includes a particle system effect, such as a simulation of flames, plasma, lightning, or liquid, particles may form an extension that points towards an item, such as a lightning bolt or a deformation of a water droplet, to give the appearance of interaction with an item.

In FIG. 13, for example, the object 1302 is an avatar, and the arm 1304a of the avatar is designated as the control portion. As the user moves or arms their arms left or right in the space around their body, the arm 1304a is animated to move left or right, respectively, and items are selected based on the proximity of an item to the arm or, more particularly, a hand or fingers on the arm. Similarly, the hand 1307 may also be designated as the control portion. In similar arrangements, movement of a user's hand or hands up or down may in the space around their body may cause the arm 1304a or hand 1305 to move up or down, such as in a manner befitting of human motion.

Since these up or down motions may move the arm 1304a or the hand 1305 away from the items, at certain points when the arm 1304a or the hand 1305 is not near to (or is not interacting with) an item or the guide line, the ostensible "selection" of an item will not cause the item to be output. By defining the guide line so that the avatar is for the most part below the guide line, the selection of characters or items by the object may occur by positioning the avatar's hands overhead of the avatar and above the guide line.

The designation of a potential control portion of an avatar as the control portion may be dynamically swapped to another control portion. For instance, and again referring to FIG. 13, if the user swaps arms that they are using as their control object, or moves a single arm the right past a position associated with item 1306n, the control portion may be swapped from left arm 1304a to right arm 1304b, enabling the left arm 1304a to interact with and select all items to the left of item 1306n along the guide line 1301, and enabling the right arm 1304b to interact with and select all items to the right of item 1306o along the guide line 1301. Such a feature may increase the visual pleasure of the user experience because, instead of merely selecting items along the items using a plain mouse cursor, the user appears to be controlling an avatar that reacts in a realistic and intuitive manner.

If swapping occurs and the left arm 1304a is no longer designated as the control object, the left arm 1304a is animated to return to a neutral, resting, or relaxed position, such as a position along the side of the torso of the object 1302. Conversely, such a swapping would cause the right arm 1304b to be seamlessly animated to move from the relaxed position along the side of the torso of the object 1302 to position previously occupied by the arm 1304a, or a position adjacent to that position. Continuing with this example, if the user were to quickly move the their arm or arms back and forth between the space along the guide line bounded by items 1306n and 1306o, the avatar could be animated as alternatively flapping their arms from the side of the object 1302 to overhead the object 1302, in a pleasing, humorous, or visually stimulating manner.

In a further example, the eyes of an avatar may be designated as the control object, and they may appear to stare at or follow items along a guide line that may surround the object. Other portions of the avatar that are not designated as the control object may also be animated, for instance to appear to be react to a highlighted item, or to position the avatar in a desired pose or a more realistic pose based on a highlighted item. In one implementation, a mouth of an avatar may be animated to appear as if it is speaking or otherwise verbalizing a selected or highlighted item, or the neck or head of an avatar may be animated to be craned, thereby increase the emphasis that the appearance that the avatar is straining to look at or consider a highlighted object.

In a similar manner, if multiple objects (e.g. multiple avatars) are displayed in the user interface, a second object may be swapped in as a controlling object based on a user selection, upon proximity to a highlighted letter or the enhanced control, or based on any other factor. Thus, the control portion or control object designation may be swapped from the first potential control portion or object to a second potential control portion or object, or from the second potential control portion or object to the first potential control portion or object.

The selected item may be output. Outputting the selected item may further include displaying the selected item, outputting an electronic indicia of the selected item, or highlighting the selected item by changing a color, opacity or size of the selected item within the user interface. The selected item or an indicia of the selected item may be output to another device or a storage medium for later use.

In FIG. 11, the color, opacity or size of the selected item 1106r has been changed to a first degree or extent, thereby making the selected item 1106r appear the largest out of all of the items displayed along the guide line 1104, and the color, opacity or size of items 1106p and 1106t, which are adjacent to and equidistant from selected item 1106r, have been changed to a second, lesser degree or extent. By also changing the color, opacity, size or other characteristic of adjacent items, the user can identify the position of a cursor or of a selected item more easily, increasing the intuitive nature and ease of use of the control. The color, opacity, size, or other characteristic of items may indicate the cursor position even where no cursor image is explicitly rendered.

Since the enhanced control allows for the selection of a small number of items at a given point in time and most items thus remain unselected, the unselected items may be reduced in size to allow for a large number of items to be displayed within the user interface. Increasing the size of certain items under consideration for selection, however, may increase the overall recognition or readability of the items under consideration for selection, thereby increasing reliability of the control. Put another way, in decreasing the size of unselected items, a larger number of selectable items can be presented to a user than could otherwise be discretely selected or touched.

As described in more detail below, the selected item 1106r may be output in output region 1107 of the user interface 1101, along with previously selected item 1106f and forecasted items 1109, which are dynamically determined based on the currently selected and previously selected items using forecasting or prediction heuristics.

The enhanced control provides for the on-screen selection of items from a set of items, such as the selection letters from the alphabet. A representation of the user is displayed, such that the representation may conveniently and reliably touch selectable items aligned along a guide line or arc dynamically positioned relative to a representation. A touch may be determined where a part of the representation intersects with an item's region along the guide line. When a portion of the representation enters the touch region, items near that touch region may be zoomed-in or otherwise highlighted.

Figure 18:
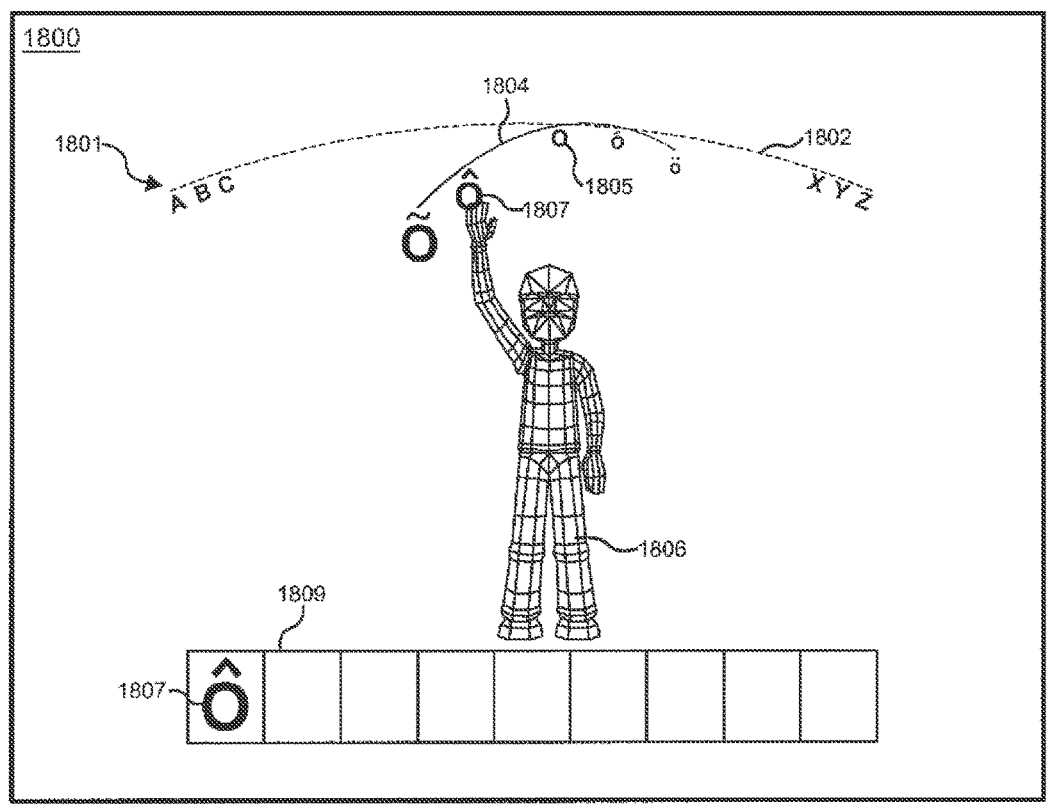
Figure 19:
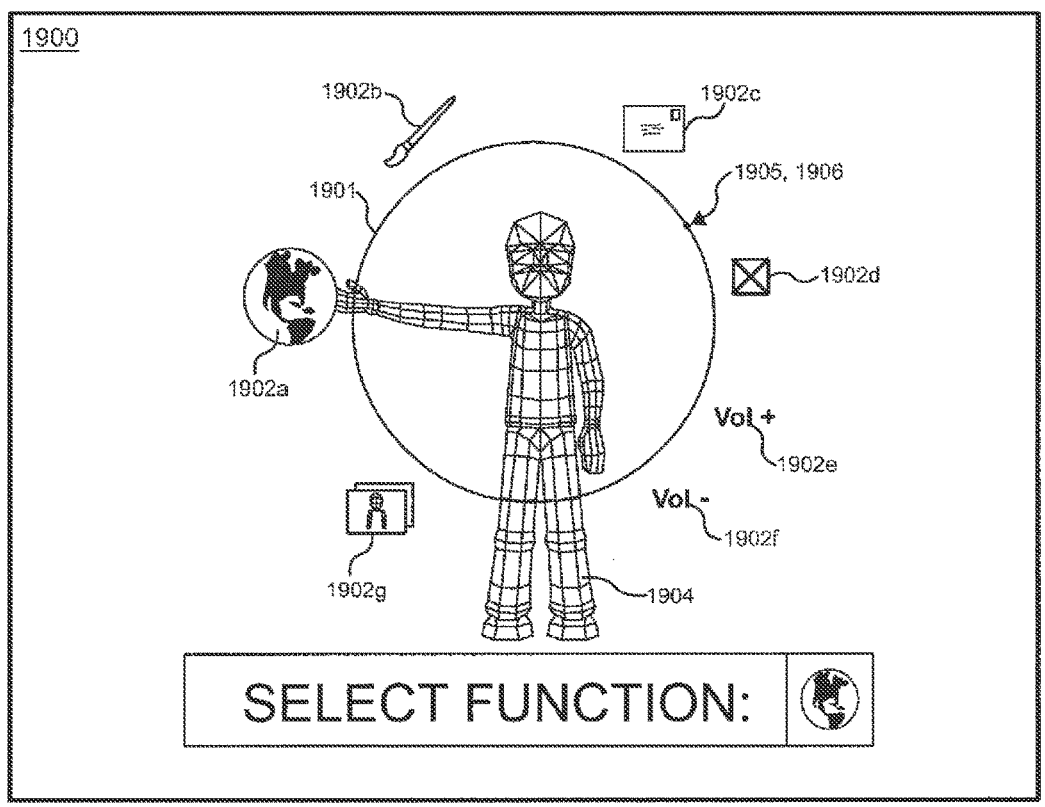

Although the guide line is described above as being defined in two dimensions relative to the object or the bounds of the user interface, the guide line may also be defined in three dimensions. For instance, and as illustrated in FIG. 18, the guide line 1801 may have a first guide line component 1802 generally defined within the same X-Y plane as the user interface, as well as a second guide line component 1804 generally defined within the Z plane, appearing to extend orthogonally in relation to the X-Y plane of the user interface. Other planes or axis may be used.

Using a three dimensional guide line, the number of items that can be displayed with the control may be exponentially increased. For instance, in addition to selecting the item "O" on the guide line 1801 by moving the arms of the avatar 1806 left and right, the user may move their arms forward or backwards in space to select other items, such as the character "Ô" 1807, which is displayed in the output region 1809 when selected. Both guide line components 1802 and 1804 are defined within the three-dimensional reach of the arms of the avatar 1806.

Furthermore, although the guide line has been described above as including discrete starting and ending points, in other implementations the guideline may not have starting and ending points, or may have the appearance of no starting and ending points, or the starting and ending points may be coincident. User interface 1900 in FIG. 19, for example, includes a circular guide line 1901 for the selection of items 1902a to 1902g. The circular guide line includes starting point 1905 and ending point 1906, however these points are coincident and not otherwise highlighted or visible on the guide line 1901 over any other points.

Figure 20:
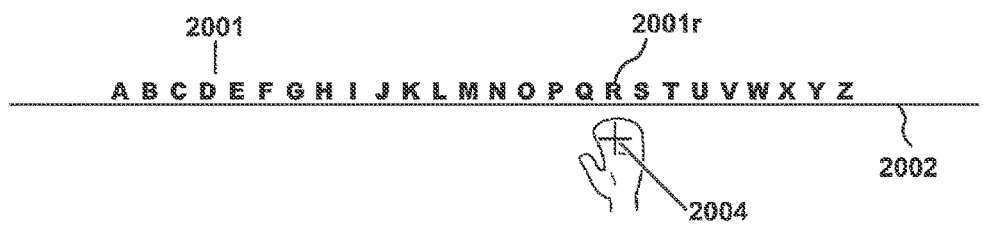
FIGS. 20 to 38 illustrate the exemplary selection of an item aligned along a guide line.
Figure 21:
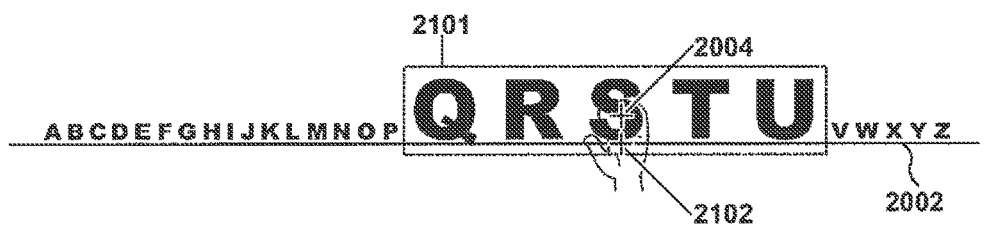

Furthermore, and unlike some other exemplary controls, the items 1902a to 1902g each correspond to a function to be invoked by an application, as represented by an icon. For instance, when the avatar 1904 selects the globe icon 1902a, a mapping application may be invoked. As such, the enhanced control described herein can be used for the selection of characters as well as to invoke more complex functionality, in an instinctive and visually pleasing manner. Other icons may represent other functions, including media functions such as a volume up or down function, a send mail function, a disable control function, or an image viewer function FIGS. 20 to 24 illustrate the exemplary selection of a particular item from a set of items 2001 aligned along a guide line 2002. In FIG. 20, a cursor 2004, which is mapped to and depicted as a hand of an avatar, moves toward an item of interest 2001r. In FIG. 21, the position of the cursor 2004 crosses the guide line 2002. The crossing of the guide line 2002 may initiate a further detection process which selects or identifies a subset 2101 of the items 2001 based on a distance between each item and the cursor 2004. The position of the cursor 2004 is determined based on the position of the user's hand in the space around their body, as detected in a camera image.

The subset 2101 of the items 2001 are displayed in a larger size or scale of font, facilitating easier selection by the user. Selection of the subset 2101 of the items 2001 and the enlarging of the display of the subset 2101 of the items 2001 may occur in response to detecting that the cursor 2004 has crossed the guide line 2002, or may occur irrespective of the position of the cursor 2004 relative to the guide line 2002. Upon detecting that the cursor 2004 crosses the guide line 2001 at base position 2102 or that an item has been selected, user feedback may be generated, including for instance sound, imagery, and/or tactile output such as a vibration.

Figure 22:
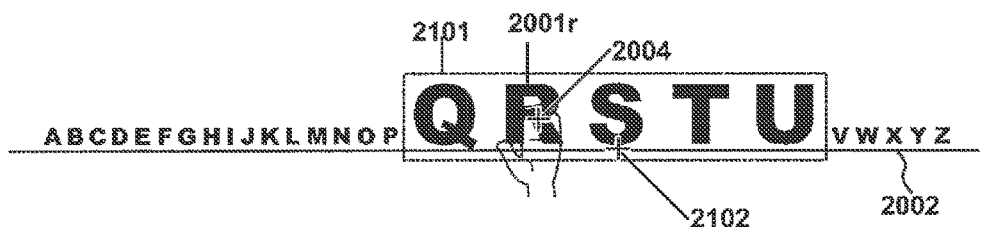

The user selects the item of interest 2001r in FIG. 22. Highlighting the subset 2101 permits the user to select a general area containing the item of interest 2001r, to "zoom in" on items within that area, and to reliable and conveniently select the item of interest 2001r, which represents the letter "R." Selection may occur using mouse events, keyboard or keypad strokes, gesture recognition, camera-based inputs, or through many other approaches.

Figure 23:
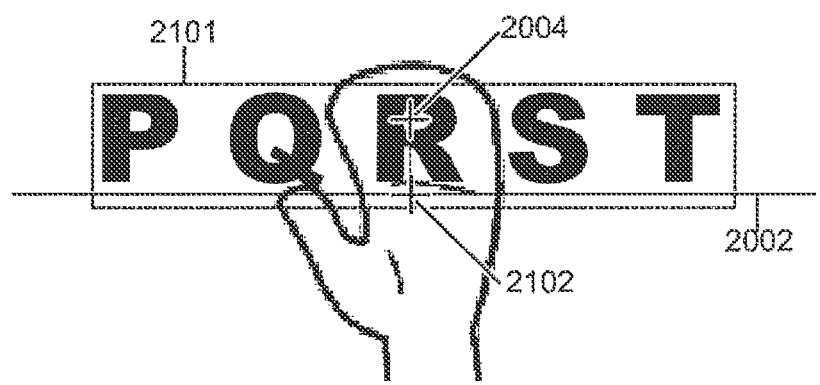

The location of the base position 2102, representing the position where the cursor 2004 has crossed the guide line 2001, may be detected in many ways. For instance, and as shown in FIG. 23, the location of the base position 2102 may be determined as a position on the guide line 2001 nearest to the cursor 2004 observed at a time after the cursor 2004 is detected above the guide line 2001, or nearest to a highlighted item such as item 2001r.

Figure 24:
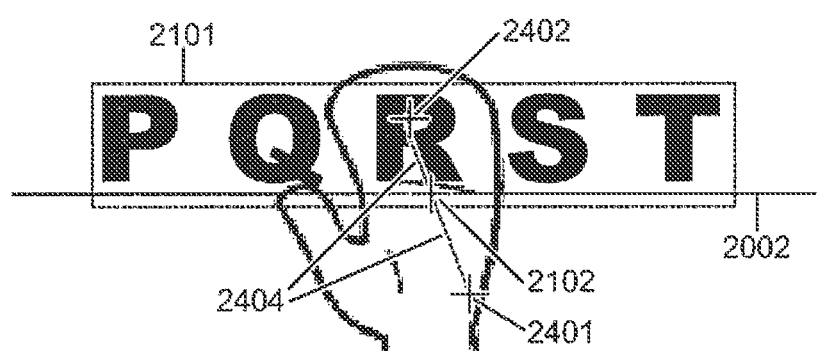

The base position may be detected using other approaches as well. For instance, the location of the base position 2102 may be detected as the cursor 2004 crosses the guide line 2001, or using positions of the cursor 2004 at times before and after the crossing of the guide line 2001. FIG. 24, for instance, illustrates endpoint 2401, representing a position of the cursor 2004 observed at a time prior to crossing the guide line 2002, and endpoint 2402, representing a position of the cursor 2004 observed at a time after crossing the guide line 2002. The base position may be determined as the intersection of the line segment 2404 defined by the endpoints 2401 and 2402, and the guide line 2001.

Highlighting the subset 2101 of the items 2001 may include determining a position along the guide line 2001 of the items that make up the subset 2101. In some implementations, items positioned in proximity to the base position 2102 are selected to be part of the subset 2101 of the items 2001 to be highlighted (e.g. displayed in a large size), such that items near the base position 2102 remain in or near their original, non-highlighted positions, and items further away from the base position 2102 move outwards to accommodate for the increase in size of the subset 2101 of the items 2001.

Equation (1), below, may be used to determine the position of items that are not within the subset 2101 after the subset 2101 has been highlighted.

$$X'_i = X_b + (X_i - X_b) \cdot \left(\frac{S'_i}{S_i}\right) \qquad (1)$$

Figure 25:
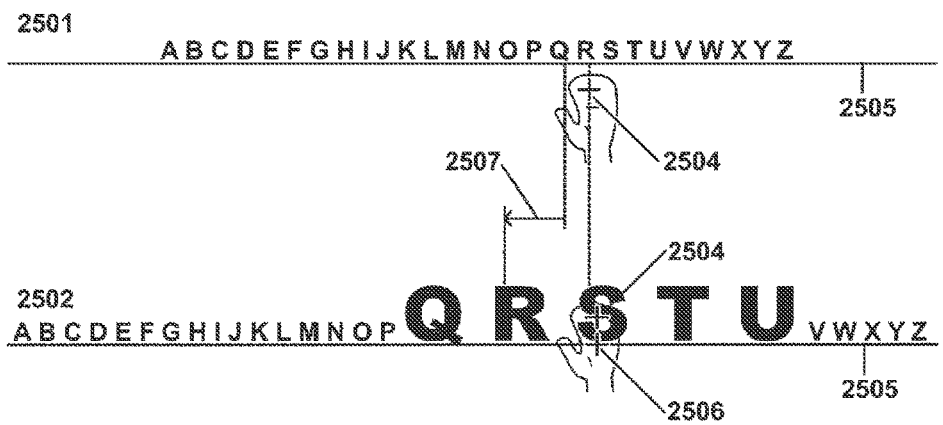

In Equation (1), $X_i$ represents the position of item i along the guide line, in the original state; $X'_i$ represents the position of item i along the guide line, in the enlarged state; $X_b$ represents the base position along the guide line; $S_i$ represents the base size of item i in the original state; and $S'_i$ represents the size of item i in the enlarged state FIG. 25 illustrates a subset of items in a first state 2501 prior to the highlighting of the subset of items, and in a second state 2502 after the highlighting of the subset of items. For example, if a cursor 2505 initially crosses the guide line 2505 under the item "S" (such that the base position 2506 is coincident to the item "S"), the item "S" remains in its original position and the item "R" is displaced by distance 2507 towards the left relative to its original position. The second state 2502 thus demonstrates the items' scaled size and position following highlighting.

Figure 26:
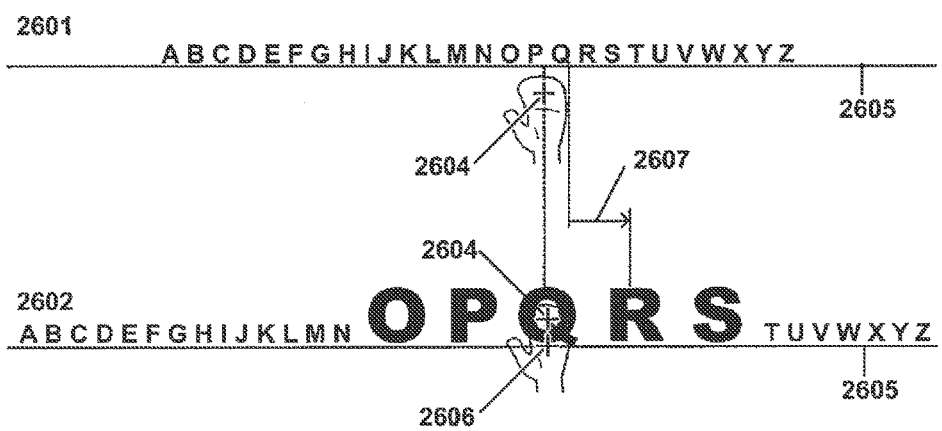

FIG. 26 illustrates a subset of items in a first state 2601 prior to the highlighting of the subset of items, and in a second state 2602 after the highlighting of the subset of items. For example, if the cursor 2604 crosses the guide line 2605 under the item "Q" (such that the base position 2606 is coincident to the item "Q"), the item "Q" will remain in its original position and the item "R" is displaced distance 2607 towards the right relative to its original position. The second state 2602 thus demonstrates the scaled items following highlighting. Accordingly, the position of the cursor 2604 used to select a particular item may be dependent on the position where the cursor 2604 initially crossed the guide line 2605.

Figure 27:
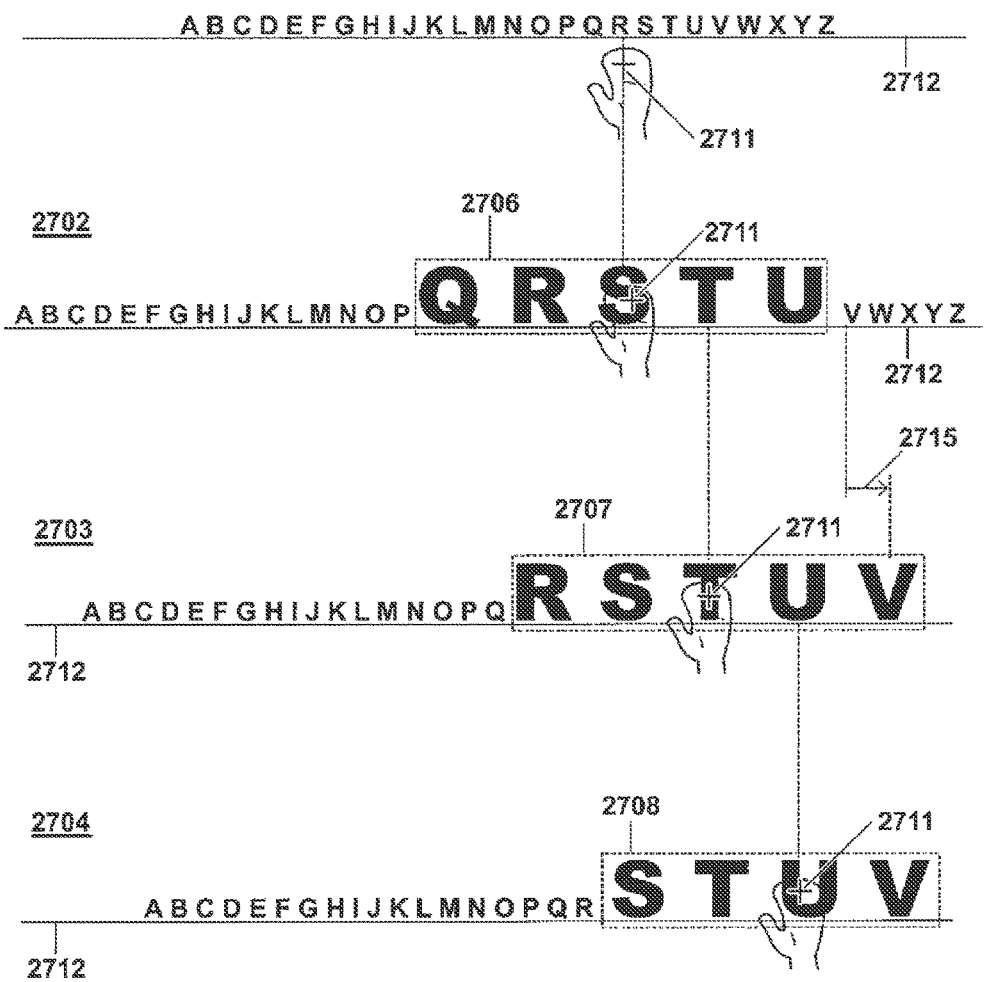

FIG. 27 illustrates a subset of items in states 2701 to 2704 associated with the highlighting of the subset of item. Specifically, FIG. 27 shows an overview of the selection and highlighting of first through third subsets 2706 to 2708 of items 2710. The second and third subsets 2707 and 2708 may be positioned according to the position of a cursor 2711 relative to first and second subsets 2706 and 2707, respectively.

In state 2701, the items 2710 reflect their original, non-highlighted size and position. In state 2702, the first subset 2706 of the items 2710 has been selected and highlighted. In state 2703, the second subset 2707 of the items 2710 has been selected and highlighted. In state 2704, the third subset 2708 of the items 2710 has been selected and highlighted.

In state 2702, the cursor 2711 initially crosses the guide line 2712 under the item "S" (such that the base position is coincident to the item "S"), the item "S" remains in its original position and the surrounding letters are displaced outwards from their original positions. Transitioning from state 2702 to state 2703, if the cursor 2711 moves to right, the second subset 2707 of the items 2710 within a distance of the cursor 2711 is selected. In the state 2703, if the cursor 2711 moves along the guide line 2712 to be coincident to the enlarged item "T", the item "T" remains in its enlarged position and the item "V" is highlighted moved distance 2715 further towards the right along the guide line 2712.

If insufficient space exists on the guide line 2712 for certain items, such as items "W" through "Z," the items are "pushed off" the end of the guide line, and are not displayed. Transitioning from the state 2703 to state 2704, if the cursor 2711 continues to move further towards the right end of the guide line 2712, there may also be insufficient space to display additional items that are part of the second subset 2707, and the third subset 2708 may be formed (as a subset of the second subset 2707).

In order to select an item on the right portion of the second subset 2707 such as the item "U," or an item that has been "pushed off" the end of the guide lines such as the items "W" to "Z," the user may re-cross the guide line 2712 with the cursor 2711, and cross the guide line 2712 a third time to establish a new base position nearer to the desired item. Furthermore, instead of "pushing off" items to the right end of the guide line 2712, items on the left end of the guide line may be "pushed off" instead to accommodate for the display of items that would otherwise be "pushed off" of the right end. In some implementations, instead of "pushing off" items, items may be decreased in size according to the available space on a guide line so that all items are displayed on a guide line.

In other implementations, items "pushed off" the right end of the guide line may re-appear on the left end of the guide line. In implementations utilizing a continuous (e.g. circular) guide line, items may be pushed around the guide line. Therefore, in an example of a circular guide line where a user may move a cursor clockwise around a continuous guideline, items excluded from the current subset of items may flow clockwise at a lesser angular velocity than the cursor (as they make room for items to grow as they are added to the subset). In this example, a cursor may move multiple revolutions around a guide line for one revolution of an item around the guide line.

Scrolling may be used to facilitate a selection of items that would otherwise have been pushed off an end of a guide line. Scrolling may include detecting if a cursor 2711 is within a predefined distance of an end of a guide line 2712, and applying a velocity to item positions. Where item positions are calculated relative to a base position (see Equation (1), above), the velocity may be applied to the base position, and items may be displaced accordingly.

Figure 28:
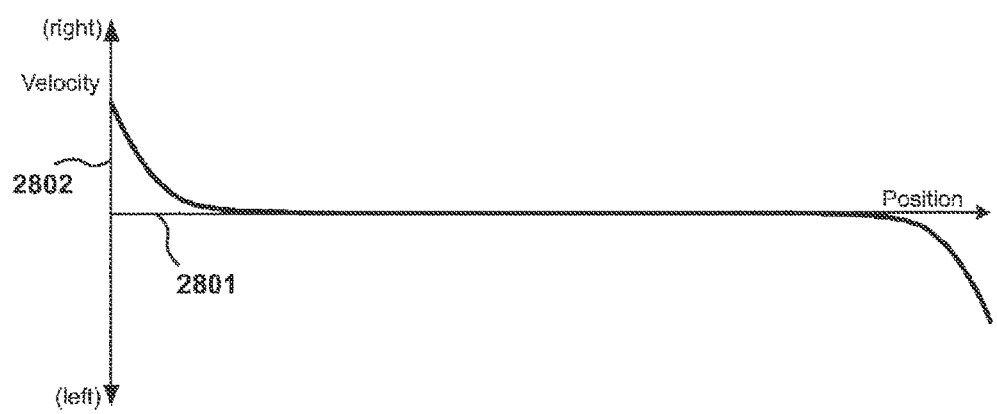

FIG. 28 illustrates an exemplary velocity function, in which the horizontal axis 2801 represents positions along a guide line, and the vertical axis 2802 represents velocity. Using this velocity function, items are moved or shifted by applying a velocity when the cursor position is near an end of the guide line, and items are not moved or shifted (since the velocity is zero) when the cursor position is at the center of the guide line.

Figure 29:
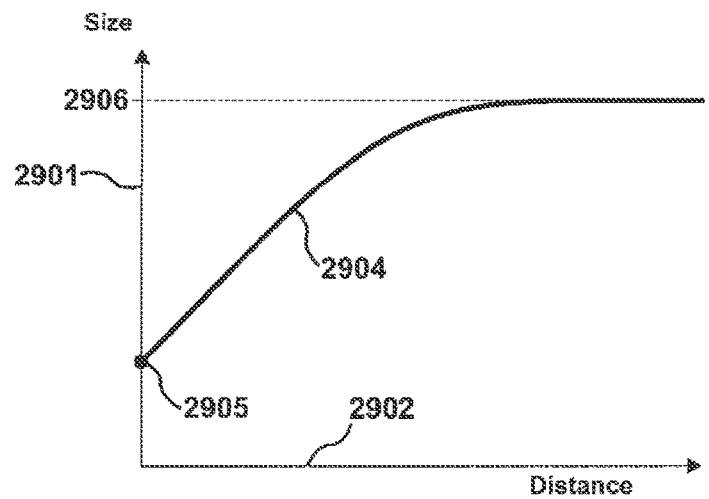

FIG. 29 illustrates an exemplary scaling function which may be used to scale the size of an item (reflected by vertical axis 2901) in a subset of items based on a distance (reflected by horizontal axis 2902) between the position of a cursor relative to a guide line. As represented by the curve 2904, the size of an item ($S_i'$) may thus be a function of the current position of a cursor. A base size (Si) associated with non-highlighted items or all items if the cursor has not crossed the guide line is determined by referencing point 2905, and line 2906 defines a maximum size associated with a highlighted item.

In one example implementation, the slope of the curve 2904 is approximately 1:1 near the point 2905, so that item sizes appears to grow linearly and proportionally as the proximity to the cursor decreases. Growth of the item would begin to off near the maximum size, to produce an aesthetically pleasing transition as the cursor becomes increasingly proximate to a highlighted item.

Figure 30:
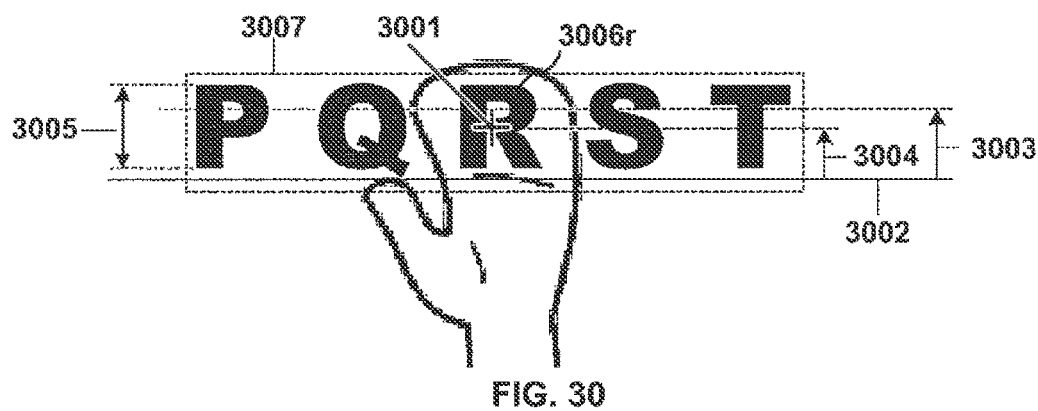
Figure 31:
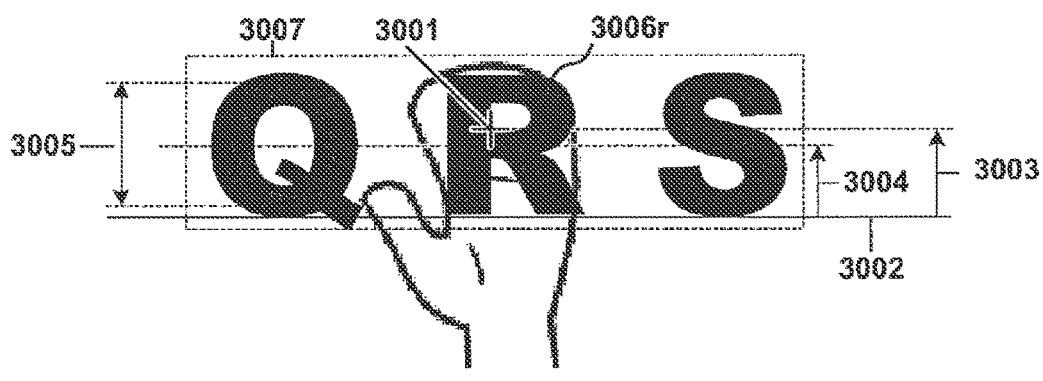

FIGS. 30 and 31 illustrate the use of the scaling feature by the enhanced control, specifically occurring when a cursor 3001 crosses a guide line 3002. A height 3004 represents a distance between the position of the cursor 3001 and the guide line 3002, and a height 2005 represents a size of items, such as item 3006*r*, in a subset 3007. The height 3005 of items in the subset 3007 is scaled based on the height 3004, making items appear larger in FIG. 30, where the cursor 3001 has crossed the guide line 3002 by a small amount, than in FIG. 31, where the cursor 3001 has crossed the guide line 3002 by a smaller amount. As above, the position of the cursor 3001 may be determined using camera-based input.

Figure 32:
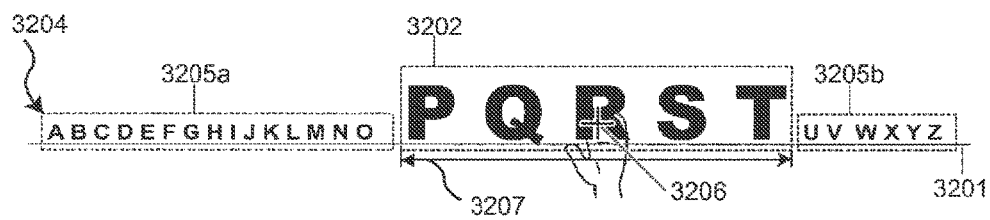
Figure 33:
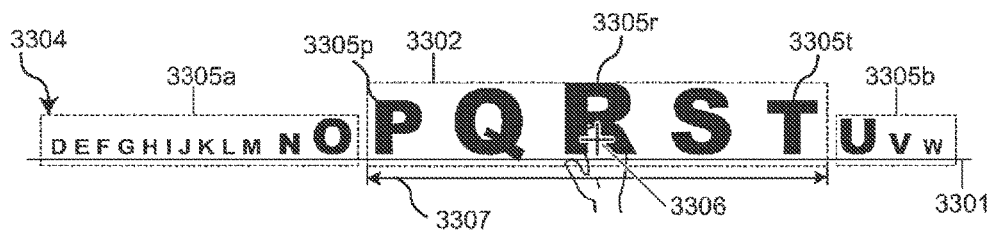

FIGS. 32 and 33 illustrate exemplary guide lines in which a subset of items is highlighted. Specifically, FIG. 32 illustrates an exemplary guide line 3201 in which a subset 3202 of items 3204 is displayed in an enlarged manner. Selecting the subset 3202 of items 3204 may include selecting a predefined number of items, or dynamically selecting a number of items to include within the subset 3202 based on the size of the items.

The number of items to include in the subset 3202 may be dynamically selected so that the items of subset 3202 span the entire length 3207 of the guide line 3201, or they may span a portion of the guide line 3201. As shown in FIG. 32, items 3205*a* and 3205*b* that are excluded from the subset 3202 may also be displayed along the guide line 3201. The number of items in the subset 3202 may also change based on size of the items within the subset, for example where subset 3007 (in FIG. 30) displays five items, and subset 3007 (in FIG. 31) displays three items, even though the width of the subset 3007 remains the same.

Highlighting items by displaying the items of a subset at a large size may include displaying all of the highlighted items at the same large size, as illustrated in FIG. 32, or by displaying individual items within a subset at a size that is dependent on its position along the guide line relative to a cursor position, as illustrated in FIG. 25.

FIG. 33 illustrates an exemplary guide line 3301 in which a subset 3302 of items 3304 is displayed with a varying item size. For example, the size of items 3305*p* and 3305*t* at the ends of the subset 3302 (representing letters "P" and 'T,' respectively), may be sized smaller than the item or items at the center of the subset 3302, such as the item 3305*r* (representing the letter "R"). Displaying items in the subset 3302 with varying sizes may produce a pleasing aesthetic appearance and may make use of the enhanced control more intuitive. As shown in FIG. 33, items 3305*a* and 3305*b* that are excluded from the subset 3302 may also be displayed along the guide line 3301.

Displaying the items of the subsets 3202 and 3302 at a large size may include animating the items. An animation may include enlarging the items of the subset and translating the position of items along the guide line (e.g., keeping the items perpendicular to the guide line) over a short period of time. Items that are excluded from the subsets 3202 and 3302 may be animated to shrink in size and move outwards along the guide line, in order to "make room" for the subsets 3202 and 3302.

Items that are "pushed off" from the ends of a guide line may simply disappear, or may be animated to fall off the edge of the guide line or to be destroyed in a visually stimulating or humorous manner, such as by combustion, implosion, vaporization, explosion, liquefaction, crushing, or other techniques. Similarly, previously "pushed off" items that reappear due to space being made on the guide line may simply re-appear, or may be animated to fall from the top of the user interface back onto the guide line or to be spontaneously generated in a visually stimulating or humorous manner.

Where a guide line is discontinuous, items may be animated to move across the discontinuity. Items may be animated to move across the gap at a high velocity, or may be animated to be "pushed off" and "reappear" using any of the above visual effects. Likewise, items that are "pushed off" one end of a guide line to re-appear on the opposite end may be animated to move between the guide line end points at a high velocity, or may be animated to be "pushed off" and "reappear" using any of the above visual effects.

Figure 34:
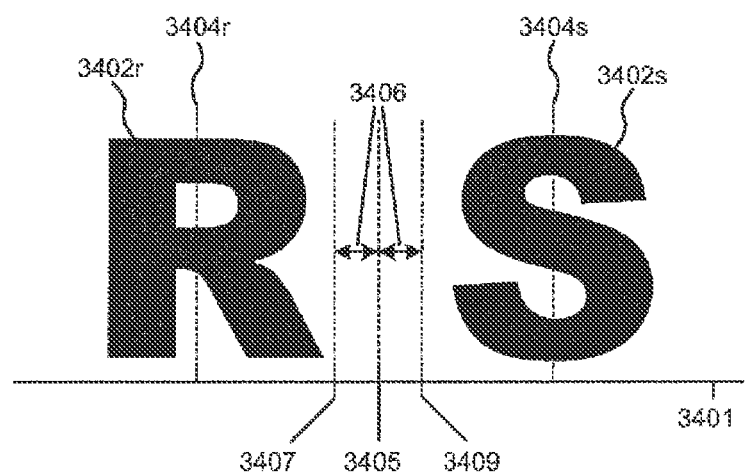

FIG. 34 depicts the activation of an item along a guide line, where "activation" or "highlighting" generally relate to the determination of an item to select. A system to determine an item to select may use hysteresis. Selection may include determining an initial selected item when a cursor initially crosses a guide line, where the initial selected item may be the item whose position is nearest in distance to the base position. Thereafter, in order to reduce inadvertent flicker between two adjacent items when a cursor is disposed in between items, selection may include determining a new selected item whenever the cursor moves a predefined distance beyond the midpoint between adjacent items.

For example, the position along a guide line 3401 of two items 3402*r* and 3402*s* are indicated by lines 3404*r* and 3404*s*, the position of the midpoint between the items 3402*r* and 3402*s* is indicated by line 3405, and a distance 3406 represents a predefined distance. If, for example, the item 3402*s* (i.e. the letter "S") is the initial selected item, the user would move a cursor left of line 3407, which is the predefined distance 3406 beyond the midpoint 3405 in the direction towards the item 3402*r* (i.e. the letter "R") to select the Item 3402*r*. If the item 3402*r* is subsequently selected, to re-select the item 3402*s*, the user would move a cursor right of line 3409, which is the predefined distance 3406 beyond the midpoint 3405 in the direction towards the item 3402*s*.

The predefined distance may be defined based upon a desired maximum distance a cursor may be expected to waver or shake while the user attempts to remain still, accounting for the effects of user movements caused by involuntary body tremor or limitations of the input unit. An item may be deselected when the position of the cursor is below the guide line, or when a cursor is not found or is not within a particular user interface or region of the user interface occupied by the enhanced control. Selection of an item may further generate user feedback, including for example sounds, imagery, and/or a tactile output such as a vibration.

Displaying the items of the subset may include displaying items such that their appearance provides user feedback as to their state of selection. For example, a selected item may be displayed in a unique color, or be displayed with a visual effect such as the appearance of glowing. A currently selected item may be activated or highlighted when the item is in a selected state for longer than a first predefined duration threshold. In this regard, an item is activated when a cursor is held over an item for a period of time. Activation may be repeated or negated if a selected item remains selected for longer than a second predefined duration threshold.

Moreover, an item may be activated or highlight when a position of a cursor is stationary for a period of time. A cursor may be classified as stationary when the change in the component of position parallel to the guide line is less than a predefined distance threshold for more than a predefined time threshold. For example, an item closest to the position of the cursor is identified and activated. Activation may be repeated or negated if a cursor remains classified as stationary for longer than a second predefined duration threshold. Additionally, an item may be activated based on a distance between a cursor position and relative a guide line. For instance, an item may be activated when such a distance exceeds a predefined distance threshold.

In other examples, activation of item may result from another type of user input after selection of the item. For instance, the user may provide another type of user input to activate a selected item. In these examples, to activate a selected item, the user may touch a user input button (e.g., on a controller), provide an audible input (e.g., saying "activate"), performing another type of gesture (e.g., moving the hand used to select the item toward the display or moving the user's other hand to another portion of the display image to activates the selected item), or providing any other type of user input.

Figure 35:
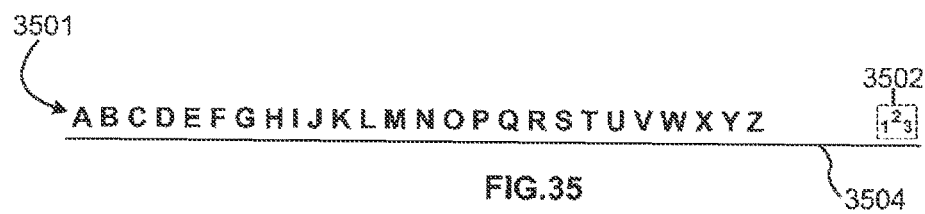

FIGS. 35 to 38 illustrate exemplary item sets. In FIG. 35, items 3501, which include characters from the English alphabet, includes an item 3502 that, when activated or otherwise selected, opens a second set of items. When selected, the second set of items may appear along the guide line 3504 with the items 3501 or a portion of the items 3501, or the second set of items may replace the items 3501 on the guide line 3504. From the symbol used to represent the item 3502, the user may intuitively determine that the second set of items includes numbers.

Figure 36:
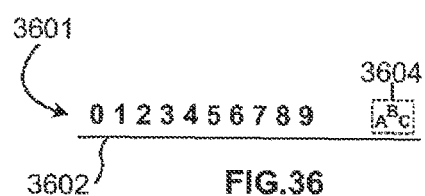

FIG. 36 illustrates items 3601 aligned with a guide line 3602. Items 3601 are displayed when the item 3502 in FIG. 35 is selected. Once the second set of items is selected, removal of the cursor below the guide line 3602 or removing the cursor from the user interface that displays the items 3601 may cause the items 3501 to be re-selected or re-activated. The items 3601 includes an item 3604 that, when activated, re-opens, re-activates or otherwise re-selects the items 3501. From the symbol used to represent the item 3604, the use may intuitively determine that the items 3501 include characters from the English alphabet.

Figure 37:
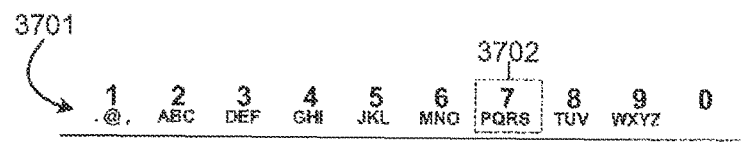
Figure 38:
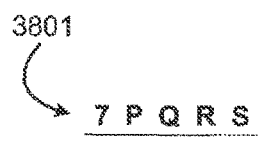

FIG. 37 illustrates items 3701 aligned with a guide line 3701, where the items each represent a combination of a number and letters that are known to be associated with keys on a standard telephone phone keypad. FIG. 38 illustrates items 3801, which are displayed when item 3702 of items 3701 are selected (see FIG. 37), and which include the combination of characters the number "7" associated with the key number "7" on a standard telephone keypad.

Using the items illustrated in FIGS. 35 to 38, a camera-based text input mechanism may be provided, such as by sequentially filling in letters that form words into a text field. Upon activating a number, letter, text symbol, or predefined text, the number, letter, text symbol, or predefined text may be appended to a string of characters that has already been input. Alternatively, activation of an item (such as an item from items 3501 in FIG. 35) may display further items, and activation of an item of the further items may appends the activated character onto a string of characters. One of the items may be a backspace item, to facilitate removal of the latest item from the string of items.

A camera-based text input mechanism may include combining characters to form compound characters. A text input mechanism for Japanese text input may include combining kana characters to form kanji characters (in a method familiar to users of Japanese personal computer keyboards). A first set of items may include items representing kana. When a kana item is activated, the corresponding kana character is appended to a string of characters. A set of items may include an item representing an operation, that when activated, activates a process that converts the latest kana characters of the string into kanji. The process of converting the latest kana characters of the string into kanji may include displaying a second set of candidate kanji items. Activating a kanji item activates a process where the latest kana characters of the string are replaced with the activated kanji. This camera-based text input method may be extended to other languages.

An alternative method for Japanese text input may include displaying a first set of items representing kana. When a kana item is activated, a second set of items is displayed. The second set of items may include the kanji for which the activated kana forms a part of. This set may be larger than the second set described above. This text input method may be extended to other languages.

A text input mechanism may include a confirmation item in a set of items. When activated, a confirmation item activates a process whereby the string of characters is provided to an application. Furthermore, the text input mechanism may include a predictive text completion process. A predictive text completion process may search a dictionary to find the most likely text that contains the characters of the string of characters. The most likely text may be displayed in an output field. A dictionary used in the predictive text completion process may be selected based on the context in which the text input mechanism is used. For example, a dictionary may include names when the text input mechanism is used to enter a name.

An application process may determine items for the user interface, depending on the state of the application. Activating an item may provide a message to an application process. The application process may be controlled based on the message.

Figure 39:
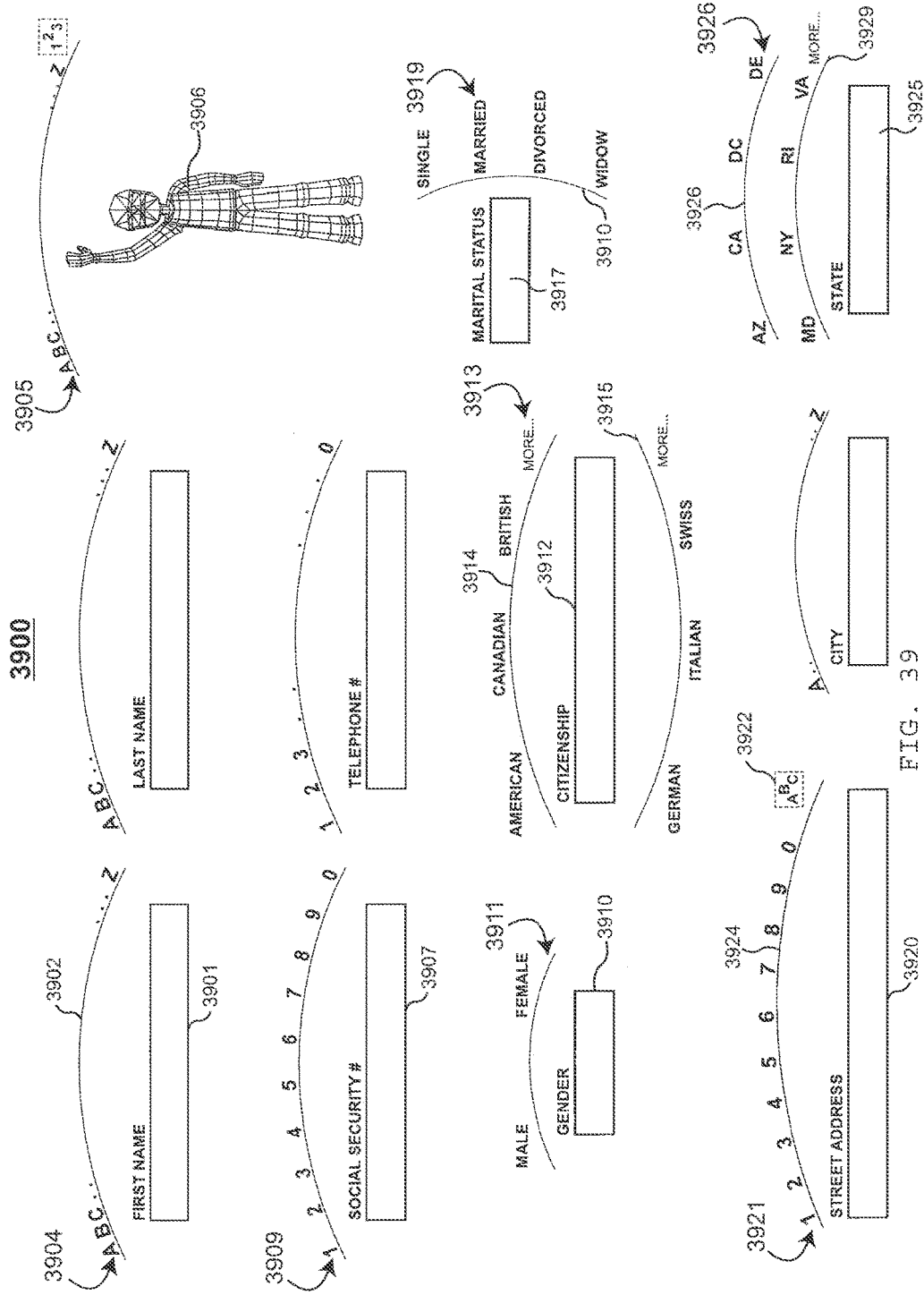
FIG. 39 illustrates a user interface that includes one or more exemplary enhanced control.

FIG. 39 illustrates an exemplary user interface 3900 including camera-based input and the exemplary enhanced control. As the user accesses the various text entry fields on the user interface 3900, the text entry fields are used as objects to define guide lines, and items appropriate to the text entry fields are displayed aligned with the guide lines without obscuring the text entry fields themselves. The user may select the items aligned with the guide lines, to populate the associated text entry fields. Although the user interface 3900 appears to illustrate multiple visible enhanced controls at once, such a simultaneous display is merely exemplary and is done to illustrate possible control positions, configurations, alignments and item types. In other user interfaces, for example, one enhanced control would be displayed at a time.

For instance, if the user accesses text entry field 3901, such as by tabbing to that field, by selecting that field with a mouse cursor, or by making an appropriate gesture, the guide line 3902 is defined relative to the text entry field 3901, and items 3904 are displayed aligned with the guide line 3902 so as to not obscure the text entry field 3901. Since the text entry field 3901 accepts text or character data, the enhanced control automatically determines that alphabetical character items 3904 are appropriate for the object type. When a user selects an item from the items 3904, the text entry field 3901 is populated with the selected item. Instead of selecting items from the guide line 3902, the user may also use the enhanced control 3905, defined around avatar 3906, for populating the various fields with items.

As the user gesticulates to tab to or otherwise accesses other fields within the user interface 3900, other enhanced controls may be dynamically defined, outputting items for selection. For instance, accessing social security number field 3907 may cause numerical items 3909 to be displayed above the field 3907; accessing gender field 3910 may cause gender items 3911 to be dynamically output above the field 3910; accessing citizenship field 3912 may cause country items 3913 to be displayed on two guide lines 3914 and 3915 above and below the field 3912, respectively; accessing marital status field 3917 may cause marital status indicator items 3919 to be displayed on a guide line 3910 on the right side of the field 3917, where the guide line 3910 may be dynamically defined on the right side due to space constraints, user preferences, or other reasons; accessing street address field 3920 may cause items 3921 that include numbers and an alphabetical symbol 3922 that replaces the numbers with alphabetical characters along a guide line 3924 to be displayed on the guide line 3924 above the field 3920; and accessing state field 3925 may cause items 3926 that include state names to be displayed on two guide lines 3927 and 3929 defined above the field 3925.

Figure 40:
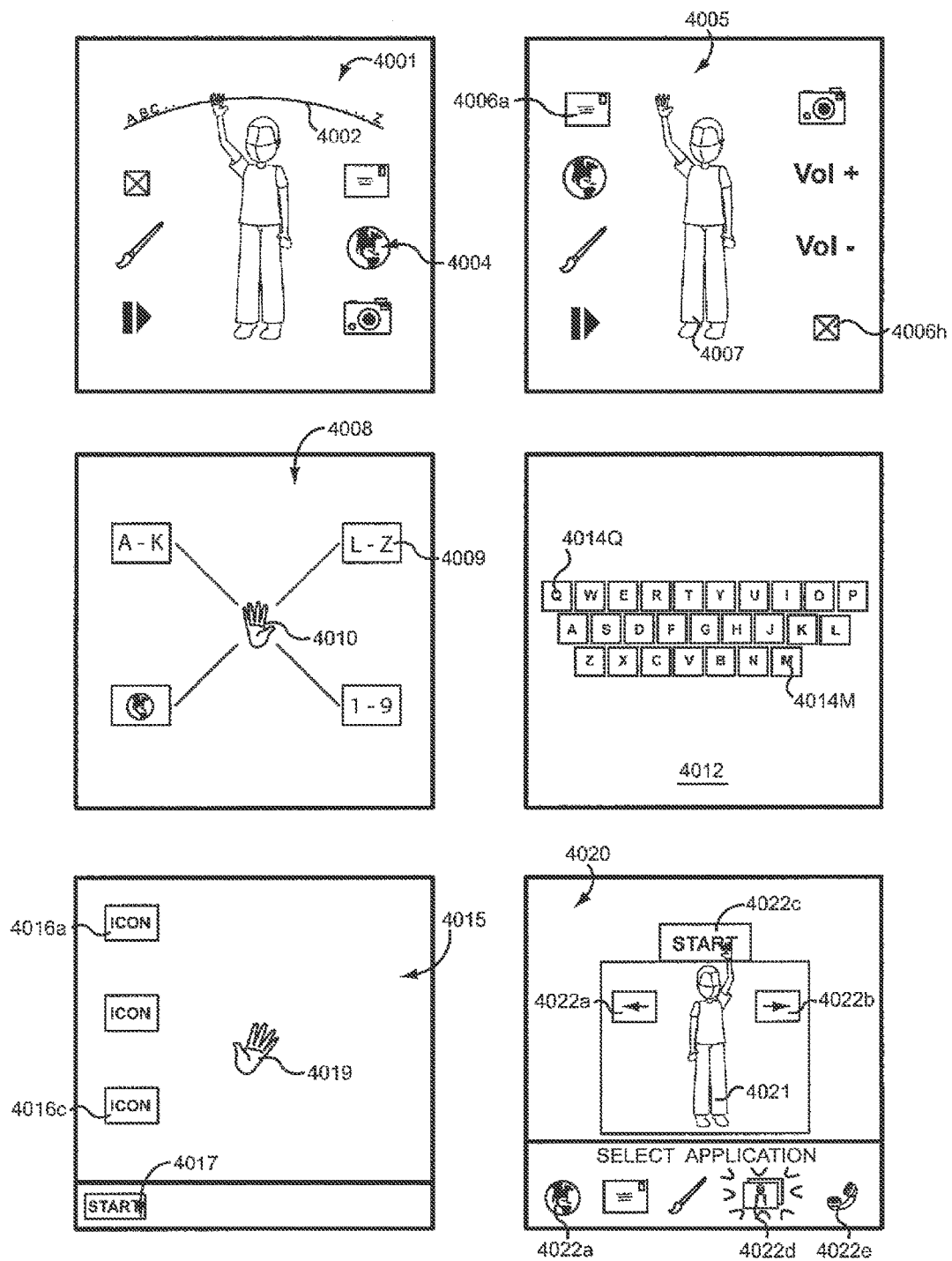
FIG. 40 illustrates other exemplary controls that use camera-based input.

While enhanced camera-based input has been described above as using a particular type of control, other types of controls can also be used. For instance, as illustrated in FIG. 40, camera-based input can be used to interaction with a control 4001, which includes a guideline component 4002 (as described above) as well as a virtual button component 4004. Control 4005 includes multiple buttons 4006a to 4006h aligned on either side of an avatar 4007. Control 4008 is a gesture wheel control, in which selection of an interaction element (such as interaction element 4009) by a representation of the user (in this case, hand 4010), causes the interaction element to further display characters or other items represented by the interaction element.

Furthermore, control 4012 is a virtual keyboard, including virtual keys 4014 disposed on a user interface in a QWERTY keyboard configuration. The control 4012 may not require a representation of the user to appear on the user interface. For instance, instead of showing a hand or avatar as a representation of the user, each of the virtual keys 4014 may light up when the user's control object in space occupies a position within a detection region that corresponds to the virtual key. Control 4015 is a standard windowing application desktop, including icons 4016a to 4016c and functional element 4017 that may be interacted with using representation 4019.

Control 4020 includes a representation of the user 4021, which may be a camera image of the user, surrounded by interaction elements 4022a to 4022c, which respectively represent a scroll left, scroll right, and invoke functions. Using camera-based input, the representation of the user 4021 causes functionality associated with the interaction elements 4022a to 4022c to be invoked. In this example, scrolling functions allow the user to choose an application 4024 from an application bar displayed at the bottom of the user interface, and to invoke the chosen application. In the example shown, the representation 4021 has chosen to invoke photo viewer application 4024d.

Figure 41:
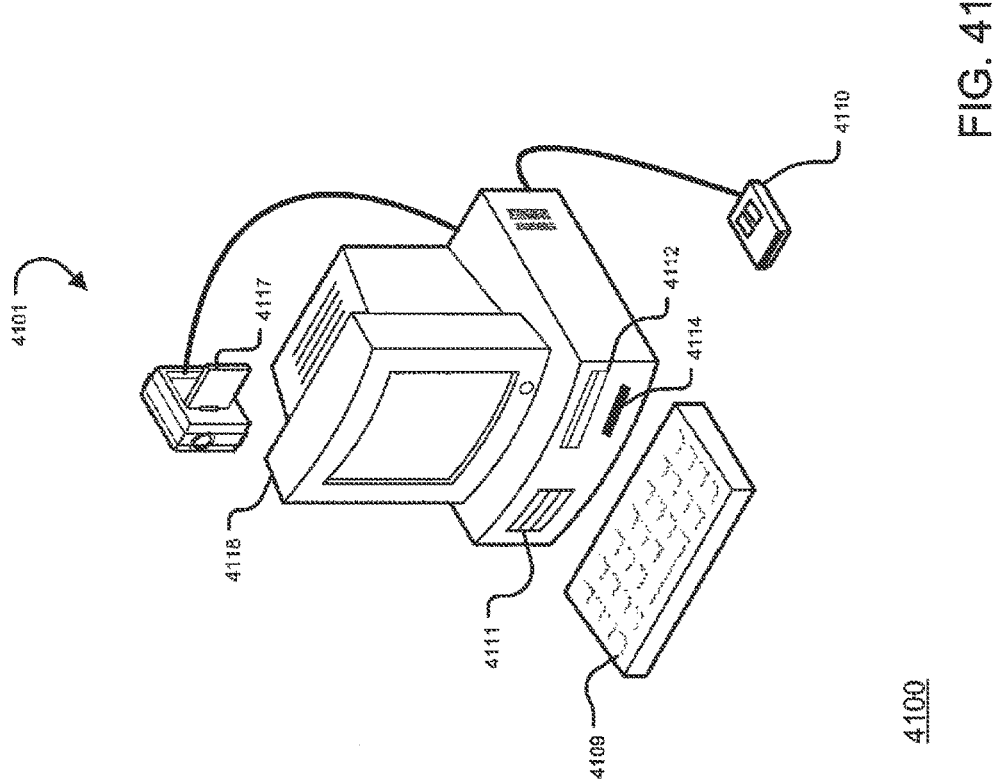
FIG. 41 illustrates an example of the exterior appearance of a computing device.

FIG. 41 illustrates an example of the exterior appearance of a computing device 4101 that further includes a processor and a user interface. The processor is configured, adapted or operable to define, in an image of a user within a scene, a detection region surrounding the user, and to detect a position of an object within the detection region. The processor is also configured to interact with a control in a user interface based on the detected position of the object.

In more detail, the hardware environment of the computing device 4101 includes a display monitor 4108 for displaying text and images to interface with a user, a keyboard 4109 for entering text data and user commands into the computing device 4101, a mouse 4110 for pointing, selecting and manipulating objects displayed on the display monitor 4108, a fixed disk drive 4111, a removable disk drive 4112, a tape drive 4114, a hardcopy output device, a computer network connection, and a digital input device 4117.

The display monitor 4108 displays the graphics, images, and text that comprise the user interface for the software applications used by the computing device 4101, as well as the operating system programs necessary to operate the computing device 4101. A user uses the keyboard 4109 to enter commands and data to operate and control the computer operating system programs as well as the application programs. The mouse 4110 may be any type of pointing device, and may be a joystick, a trackball, a touch-pad, or other pointing device. Software used to display a user interface and enable a user to enter or select text, numbers, or select from a menu of options is stored locally on computer readable memory media, such as the fixed disk drive 4111.

In a further implementation, the fixed disk drive 4111 itself may include a number of physical drive units, such as a redundant array of independent disks ("RAID"), or may be a disk drive farm or a disk array that is physically located in a separate computing unit. Such computer readable memory media allow the computing device 4101 to access computer-executable process steps, application programs and the like, stored on removable and non-removable memory media.

The computer network connection may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 4106 may be a LAN network, a corporate or government WAN network, the Internet, or other network.

The computer network connection may be a wireline or wireless connector. Example wireless connectors include, for example, an INFRARED DATA ASSOCIATION® (IrDA®) wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE® 1394 FIREWIRE® connector, a Universal Serial Bus ("USB") connector, a serial port connector, a parallel port connector, or other wireline connector.

The removable disk drive 4112 is a removable storage device that is used to off-load data from the computing device 4101 or upload data onto the computing device 4101. The removable disk drive 4112 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 4111 or on removable media for the removable disk drive 4112.

The tape drive 4114 is a tape storage device that is used to off-load data from the computing device 4101 or to upload data onto the computing device 4101. The tape drive 4114 may be a quarter-inch cartridge ("QIC"), 4 mm digital audio tape ("DAT"), 8 mm digital linear tape ("DLT") drive, or other type of tape.

Furthermore, although the computing device 4101 is described above as a desktop PC, in further implementations the computing device 4101 may be a laptop, a workstation, a midrange computer, a mainframe, an embedded system, telephone, a handheld or tablet computer, a PDA, a gaming device or console, a digital picture frame, a teleconferencing device, or other type of computer.

Figure 42:
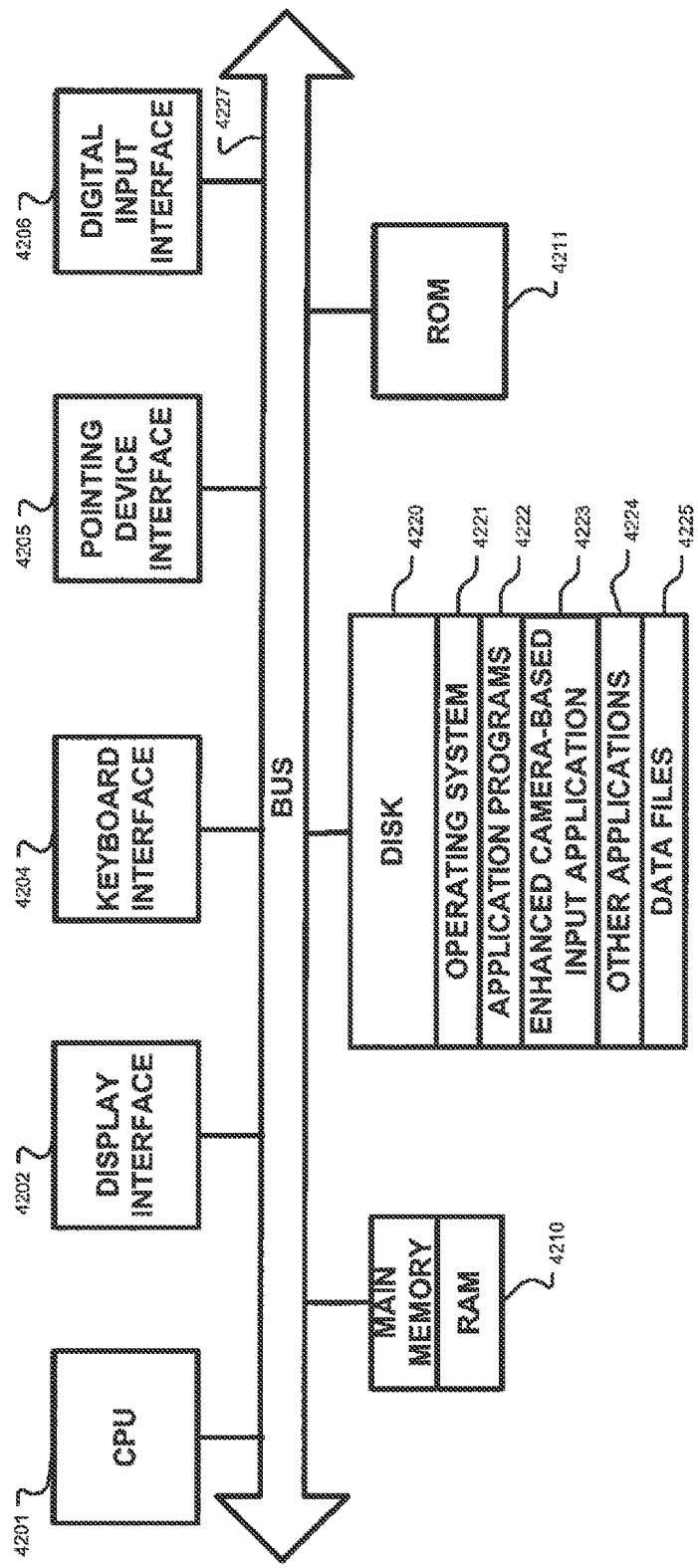
FIG. 42 is a block diagram illustrating the internal architecture of a computer shown in FIG. 41.

FIG. 42 is a block diagram illustrating the internal architecture of a computer shown in FIG. 41. An exemplary internal architecture of the computing device 4101 is now described. The computing environment includes a computer central processing unit ("CPU") 4201, where the computer instructions that comprise an operating system or an application are processed; a display interface 4202 which provides a communication interface and processing functions for rendering graphics, images, and texts on the display monitor 4108; a keyboard interface 4204 which provides a communication interface to the keyboard 4109; a pointing device interface 4205 which provides a communication interface to the mouse 4110 or an equivalent pointing device; a digital input interface 4206 which provides a communication interface to the digital input device 4117; a hardcopy output device interface which provides a communication interface to the hardcopy output device; a random access memory ("RAM") 4210 where computer instructions and data are stored in a volatile memory device for processing by the computer CPU 4201; a read-only memory ("ROM") 4211 where invariant low-level systems code or data for basic system functions such as basic input and output ("I/O"), startup, or reception of keystrokes from the keyboard 4109 are stored in a non-volatile memory device; and a storage 4220 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 4221, application programs 4222 (including the enhanced camera-based input application 4223, and other applications 4224 as necessary) and data files 4225 are stored; a computer network interface which provides a communication interface to the network over the computer network connection. The constituent devices and the computer CPU 4201 communicate with each other over the computer bus 4227.

According to another general implementation, a computer readable medium is encoded with a computer program product. The computer program product includes instructions that, when executed, operate to cause a computer to define, in an image of a user within a scene, a detection region surrounding the user, and detect a position of an object within the detection region. The computer program product also includes instructions that, when read by a machine, operate to cause data processing apparatus to interact with a control in a user interface based on the detected position of the object.

The RAM 4210 interfaces with the computer bus 4227 so as to provide quick RAM storage to the computer CPU 4201 during the execution of software programs such as the operating system application programs, and device drivers. More specifically, the computer CPU 4201 loads computer-executable process steps from the fixed disk drive 4111 or other memory media into a field of the RAM 4210 in order to execute software programs. Data is stored in the RAM 4210, where the data is accessed by the computer CPU 4201 during execution.

The computing device 4101 stores computer-executable code for an operating system 4221, application programs 4222 such as word processing, spreadsheet, presentation, gaming, or other applications. Although it is possible to provide for camera-based input using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 4201 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 3301 is more than one processing unit, including a multiple CPU configuration found in high-performance workstations and servers, or a multiple scalable processing unit found in mainframes.

The operating system 4221 may be MICROSOFT® WINDOWS NR®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 4221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 41 and 42 illustrate one possible implementation of a computing device that executes program code, or program or process steps, configured to provide for an enhanced control that allows for a user to intuitively and easily enter text, numbers, or select from a plurality of items, other types of computers or implementations may also be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
obtaining an image of a control object in a scene, the image captured by a camera;
determining a location of a first object in a user interface on a display, based on the location of the control object in the scene, wherein the first object comprises a control portion and a non-control portion;
determining a range of motion of the control portion of the first object based on a dimension of the non-control portion of the first object;
determining a first set of items; and
dynamically positioning one or more guide lines in the user interface on the display based on the determined location of the first object, the determined range of motion of the control portion of the first object, and a quantity of the items in the first set of items, wherein:
the items are shown on the display and aligned with the one or more guide lines in the user interface; and
the one or more guide lines are positioned such that the items do not overlap with the non-control portion of the first object.

2. The computer-implemented method of claim 1 wherein the user interface is shown on a display of a mobile device.

3. The computer-implemented method of claim 1 wherein the user interface is shown on a television display.

4. The computer-implemented method of claim 1 wherein the first object comprises a representation of a user.

5. The computer-implemented method of claim 1 further comprising:
determining a location of a second object in the user interface; and
repositioning the one or more guide lines such that the items do not overlap with the second object.

6. The computer-implemented method of claim 5 further, wherein the repositioning comprises changing one or more of:
a color of an item;
a line thickness of an item;
a size of an item; or
a transparency of an item.

7. The computer-implemented method of claim 5 wherein the repositioning comprises repositioning the one or more guide lines such that items are outside a determined range of motion of a control portion of the second object.

8. The computer-implemented method of claim 1 farther comprising:
determining a new location of the first object in the user interface; and
repositioning the one or more guide lines based on the new location such that the items do not overlap with the non-control portion of the first object.

9. The computer-implemented method of claim 1 further comprising:
receiving a selection of an item; and
creating, based on the selection, a new guide line having a second set of items aligned therewith.

10. The computer-implemented method of claim 9 wherein:
a guide line component of the one or more guide lines is generally defined within the same X-Y plane as the user interface; and
creating the new guide line comprises creating the new guide line to be generally defined within a plane other than the X-Y plane.

11. The computer-implemented method of claim 10 wherein items aligned with the new guide line decrease in size from a first end of the new guide line to a second end of the new guide line.

12. A device comprising a processor configured to:
obtain an image of a control object in a scene, the image captured by a camera;
determine a location of a first object in a user interface on a display, based on a the location of the control object in the scene, wherein the first object comprises a control portion and a non-control portion;
determine a range of motion of the control portion of the first object based on a dimension of the non-control portion of the first object;
determine a first set of items; and
dynamically position one or more guide lines in the user interface on the display based on the determined location of the first object, the determined range of motion of the control portion of the first object, and a quantity of the items in the first set of items, wherein:
the items are shown on the display and aligned with the one or more guide lines in the user interface; and
the one or more guide lines are positioned such that the items do not overlap with the non-control portion of the first object.

13. The device of claim 12, wherein the device is a mobile device.

14. The device of claim 12, wherein the processor is further configured to:
determine a location of a second object in the user interface; and
reposition the one or more guide lines such that the items do not overlap with the second object.

15. The device of claim 14, wherein the repositioning comprises changing one or more of:
a color of an item;
a line thickness of an item;
a size of an item; or
a transparency of an item.

16. The device of claim 14, wherein the processor is configured to reposition the one or more guide lines such that items are outside a determined range of motion of a control portion of the second object.

17. The device of claim 12, wherein the processor is further configured to:
determine a new location of the first object in the user interface; and
reposition the one or more guide lines based on the new location such that the items do not overlap with the non-control portion of the first object.

18. The device of claim 12, wherein the processor is further configured to:
receive a selection of an item; and
create, based on the selection, a new guide line having a second set of items aligned therewith.

19. The device of claim 18, wherein the processor is further configured to:

cause a guide line component of the one or more guide lines to be generally defined within the same X-Y plane as the user interface; and create the new guide line to be generally defined within a plane other than the X-Y plane.

20. The device of claim 18, wherein the processor is configured to cause items aligned with the new guide line to be displayed in decreasing size from a first end of the new guide line to a second end of the new guide line.

21. An apparatus comprising:
means for obtaining an image of a control object in a scene, the image captured by image capturing means;
means for determining a location of a first object in a user interface on a display, based on the location of the control object in the scene, wherein the first object comprises a control portion and a non-control portion;
means for determining a range of motion of the control portion of the first object based on a dimension of the non-control portion of the first object;
means for determining a first set of items; and
means for dynamically positioning one or more guide lines in the user interface on the display based on the determined location of the first object, the determined range of motion of the control portion of the first object, and a quantity of the items in the first set of items, wherein:
the items are shown on the display and aligned with the one or more guide lines in the user interface; and
the one or more guide lines are positioned such that the items do not overlap with the non-control portion of the first object.

22. The apparatus of claim 21 further comprising:
means for determining a location of a second object in the user interface; and
means for repositioning the one or more guide lines such that the items do not overlap with the second object.

23. The apparatus of claim 22 the means for repositioning comprises means for changing one or more of:
a color of an item;
a line thickness of an item;
a size of an item; or
a transparency of an item.

24. The apparatus of claim 22 wherein the means for repositioning comprises means for repositioning the one or more guide lines such that items are outside a determined range of motion of a control portion of the second object.

25. The apparatus of claim 21 further comprising:
means for determining a new location of the first object in the user interface; and
means for repositioning the one or more guide lines based on the new location such that the items do not overlap with the non-control portion of the first object.

26. The apparatus of claim 21 further comprising:
means for receiving a selection of an item; and
means for creating, based on the selection, a new guide line having a second set of items aligned therewith.

27. The apparatus of claim 26 wherein:
a guide line component of the one or more guide lines is generally defined within the same X-Y plane as the user interface; and
the means for creating the new guide line comprises means for creating the new guide line to be generally defined within a plane other than the X-Y plane.

28. The apparatus of claim 27 further comprising means for causing the items aligned with the new guide line to decrease in size from a first end of the new guide line to a second end of the new guide line.

29. A non-transitory computer readable medium encoded with instructions that, when executed, operate to cause a computer to perform operations comprising:
obtaining an image of a control object in a scene, the image captured by a camera;
determining a location of a first object in a user interface on a display, based on the location of the control object in the scene, wherein the first object comprises a control portion and a non-control portion;
determining a range of motion of the control portion of the first object based on a dimension of the non-control portion of the first object;
determining a first set of items; and
dynamically positioning one or more guide lines in the user interface on the display based on the determined location of the first object, the determined range of motion of the control portion of the first object, and a quantity of the items in the first set of items, wherein:
the items are shown on the display and aligned with the one or more guide lines in the user interface; and
the one or more guide lines are positioned such that the items do not overlap with the non-control portion of the first object.

30. The computer readable medium of claim 29 further comprising instructions for causing the computer to:
determine a location of a second object in the user interface; and
reposition the one or more guide lines such that the items do not overlap with the second object.

31. The computer readable medium of claim 29 further comprising instructions for causing the computer to:
receive a selection of an item; and
create, based on the selection, a new guide line having a second set of items aligned therewith.

* * * * *